US012663284B2

(12) United States Patent
Zhang

(10) Patent No.: US 12,663,284 B2
(45) Date of Patent: Jun. 23, 2026

(54) MAP NAVIGATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Honglong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 153 days.

(21) Appl. No.: 18/592,654

(22) Filed: Mar. 1, 2024

(65) Prior Publication Data

US 2024/0200964 A1 Jun. 20, 2024

Related U.S. Application Data

(63) Continuation of application No. PCT/CN2023/115770, filed on Aug. 30, 2023.

(30) Foreign Application Priority Data

Sep. 30, 2022 (CN) .......................... 202211206966.1

(51) Int. Cl.
*G01C 21/36* (2006.01)
*G06F 9/451* (2018.01)
*G06F 16/29* (2019.01)

(52) U.S. Cl.
CPC ........... *G01C 21/367* (2013.01); *G06F 9/451* (2018.02); *G06F 16/29* (2019.01)

(58) Field of Classification Search
CPC ...... G01C 21/367; G01C 21/34; G01C 21/26; G01C 21/3804; G06F 16/30; G06F 9/451
See application file for complete search history.

(56) References Cited

U.S. PATENT DOCUMENTS 6,202,026 B1 * 3/2001 Nimura ................ G09B 29/106
340/995.11
8,352,180 B2 * 1/2013 Geelen ............... G01C 21/3647
701/454

(Continued)

FOREIGN PATENT DOCUMENTS

CN 108931254 A 12/2018
CN 110514219 A * 11/2019 ........... G01C 21/367

(Continued)

OTHER PUBLICATIONS

CN 110514219 A with machine translation (Year: 2019).*

(Continued)

*Primary Examiner* — Dino Kujundzic
(74) *Attorney, Agent, or Firm* — Anova Law Group, PLLC

(57) ABSTRACT

A map navigation method includes displaying a navigation interface, displaying a first-type navigation map on the navigation interface in response to a target road segment of a road being in a preset road condition and an object being located in a road range other than the target road segment, and displaying a second-type navigation map on the navigation interface in response to the target road segment being in the preset road condition and the object being located within the target road segment. A scale used in the second-type navigation map is greater than a scale used in the first-type navigation map.

19 Claims, 23 Drawing Sheets

(a) SD base map (b) HD base map (c) AR base map

(56)                    References Cited

U.S. PATENT DOCUMENTS

| | | | | |
|---|---|---|---|---|
| 2005/0278115 A1 * | 12/2005 | Okada | ........... | G01C 21/367 |
| | | | | 701/410 |
| 2010/0153000 A1 | 6/2010 | Akita et al. | | |
| 2018/0253200 A1 | 9/2018 | Abe et al. | | |
| 2019/0033088 A1 * | 1/2019 | Deng | ........... | G01C 21/367 |
| 2021/0323405 A1 * | 10/2021 | Kwon | ........... | B60K 35/28 |
| 2022/0084458 A1 | 3/2022 | Sakuma et al. | | |
| 2022/0316902 A1 * | 10/2022 | Tajima | ........... | B60K 35/81 |
| 2023/0196953 A1 | 6/2023 | Tanaka et al. | | |

FOREIGN PATENT DOCUMENTS

| | | | | | |
|---|---|---|---|---|---|
| CN | 113340291 A | | 9/2021 | | |
| CN | 113590070 A | * | 11/2021 | ........... | G06F 3/1407 |
| CN | 114061600 A | * | 2/2022 | ........... | G01C 21/32 |
| CN | 114413926 A | | 4/2022 | | |
| CN | 114461742 A | | 5/2022 | | |
| CN | 114724366 A | | 7/2022 | | |
| CN | 114812598 A | | 7/2022 | | |
| DE | 112020006380 T5 | * | 11/2022 | ........... | G01C 21/3676 |
| EP | 2026038 B1 | * | 11/2011 | ........... | G01C 21/367 |
| JP | H07152318 A | | 6/1995 | | |
| JP | H1152844 A | | 2/1999 | | |
| JP | 2006023712 A | | 1/2006 | | |
| JP | 2016197839 A | | 11/2016 | | |
| JP | 2019045212 A | | 3/2019 | | |
| JP | 2020196295 A | | 12/2020 | | |
| JP | 2022061902 A | | 4/2022 | | |
| KR | 20060106407 A | * | 10/2006 | ........... | G01C 21/367 |
| WO | 2007049483 A | | 5/2007 | | |
| WO | 2022045296 A1 | | 3/2022 | | |

OTHER PUBLICATIONS

CN 113590070 A with machine translation (Year: 2021).*
CN 114061600 A with machine translation (Year: 2022).*
DE 112020006380 T5 A with machine translation (Year: 2022).*
EP 2026038 B1 with machine translation (Year: 2011).*
KR 20060106407 A with machine translation (Year: 2006).*
The World Intellectual Property Organization (WIPO) International Search Report for PCT/CN2023/115770 Dec. 22, 2023 8 Pages (including translation).
Amap AR real-scene navigation App latest version v11.17.0.28, May 27, 2022, 7 pages.
Leading the industry to achieve another breakthrough! Baidu Maps upgrades AR navigation function to provide detailed coverage of underground passage scenes. Jiangxi Internet Radio and Television Station, Aug. 13, 2021, 5 pages.
The Japan Patent Office (JPO) Notice of Reasons for Refusal for Application No. 2024-564592 Dec. 2, 2025 14 Pages (including translation).

* cited by examiner (a) 20 meters (b) 50 meters (c) 100 meters (d) 200 meters (e) 500 meters (a) Pitch angle of 40

(b) Pitch angle of 50

(c) Pitch angle of 65

(a) 200 meters, 10°    (b) 100 meters, 35°    (c) 50 meters, 35°

(d) 10 meters, 60°    (e) 5 meters, 65°    (f) 2 meters, 68°

(a)

(b)

(c)

(a)

(b)

(c)

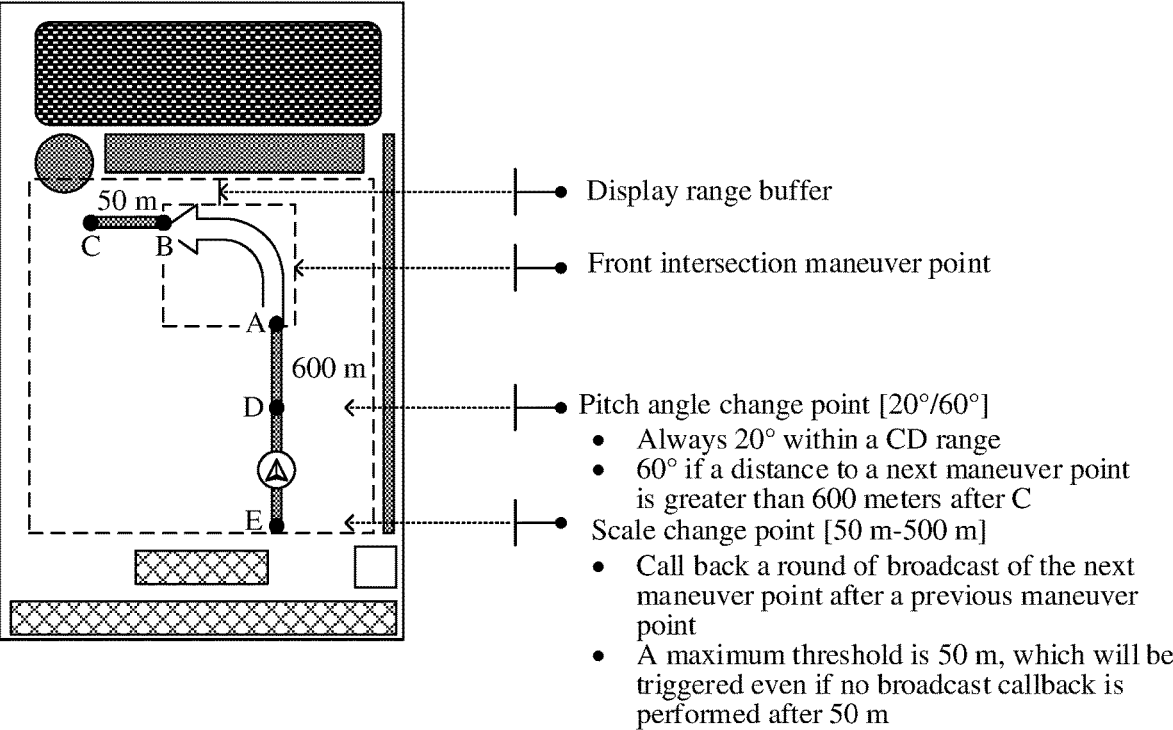

Display range buffer

Front intersection maneuver point

Pitch angle change point [20°/60°]
- Always 20° within a CD range
- 60° if a distance to a next maneuver point is greater than 600 meters after C Scale change point [50 m-500 m]
- Call back a round of broadcast of the next maneuver point after a previous maneuver point
- A maximum threshold is 50 m, which will be triggered even if no broadcast callback is performed after 50 m

FIG. 12A (a) SD base map (b) HD base map (c) AR base map

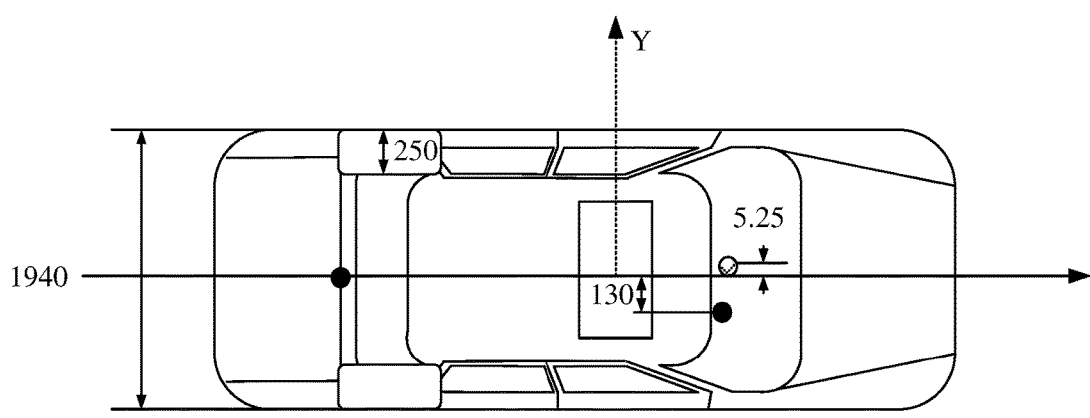
FIG. 15B
FIG. 16
Lane line extraction model
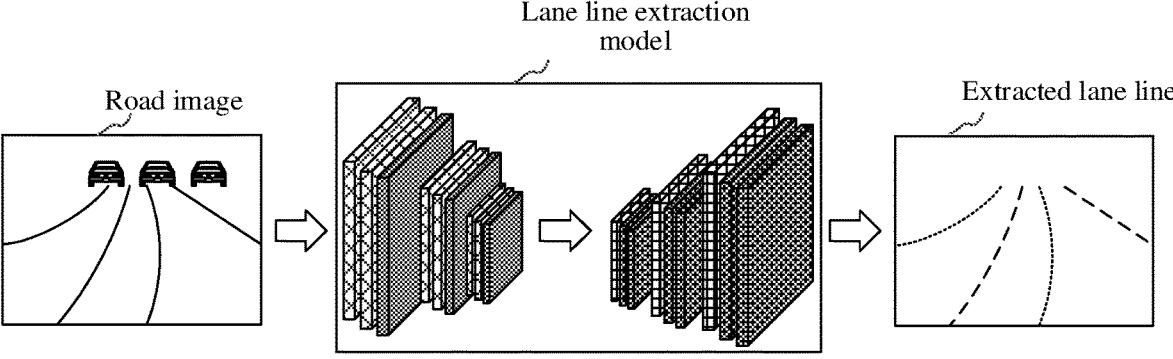
Road image
Extracted lane line
FIG. 17

Lane line

Lane line

Lane surface

MAP NAVIGATION METHOD AND APPARATUS, COMPUTER DEVICE, AND STORAGE MEDIUM

CROSS-REFERENCE TO RELATED APPLICATIONS

This application is a continuation of International Application No. PCT/CN2023/115770, filed on Aug. 30, 2023, which claims priority to Chinese Patent Application No. 2022112069661, filed with the China National Intellectual Property Administration on Sep. 30, 2022 and entitled "MAP NAVIGATION METHOD AND APPARATUS, COMPUTER DEVICE, AND STORAGE MEDIUM," the entire contents of both of which are incorporated herein by reference.

FIELD OF THE TECHNOLOGY

This application relates to the field of map navigation technologies, and in particular, to a map navigation method and apparatus, a computer device, and a storage medium.

BACKGROUND OF THE DISCLOSURE

With the development of the Internet and the mobile communication technology, online navigation is more and more widely applied. For example, while driving a vehicle, a drive can use navigation software on an on-board terminal for online navigation; and while walking on a road, a user can use navigation software on a mobile terminal for online navigation. The navigation software can display one or more types of maps, for example, at least one of a standard definition (SD) map or an augmented reality (AR) map.

In the related art, to facilitate viewing of maps with different precisions, the maps with different precisions may be simultaneously presented on a same screen. For example, an SD map and an AR map are simultaneously presented on the same screen.

However, since product forms of the maps with different precisions differ significantly, a display effect is an obvious split screen effect, which impedes quick map understanding, resulting in relatively low navigation efficiency.

SUMMARY

In accordance with the disclosure, there is provided a map navigation method including displaying a navigation interface, displaying a first-type navigation map on the navigation interface in response to a target road segment of a road being in a preset road condition and an object being located in a road range other than the target road segment, and displaying a second-type navigation map on the navigation interface in response to the target road segment being in the preset road condition and the object being located within the target road segment. A scale used in the second-type navigation map is greater than a scale used in the first-type navigation map.

Also in accordance with the disclosure, there is provided a computer device including one or more processors, and one or more memories storing one or more computer-readable instructions that, when executed by the one or more processors, cause the one or more processors to display a navigation interface, display a first-type navigation map on the navigation interface in response to a target road segment of a road being in a preset road condition and an object being located in a road range other than the target road segment, and display a second-type navigation map on the navigation interface in response to the target road segment being in the preset road condition and the object being located within the target road segment. A scale used in the second-type navigation map is greater than a scale used in the first-type navigation map.

Also in accordance with the disclosure, there is provided one or more non-transitory computer-readable storage media storing one or more computer-readable instructions that, when executed by one or more processors, cause the one or more processors to display a navigation interface, display a first-type navigation map on the navigation interface in response to a target road segment of a road being in a preset road condition and an object being located in a road range other than the target road segment, and display a second-type navigation map on the navigation interface in response to the target road segment being in the preset road condition and the object being located within the target road segment. A scale used in the second-type navigation map is greater than a scale used in the first-type navigation map.

BRIEF DESCRIPTION OF THE DRAWINGS

To describe technical solutions of embodiments of this application more clearly, drawings required for describing the embodiments are briefly described below. Apparently, the drawings in the following description show only some embodiments of this application, and a person of ordinary skill in the art can derive other drawings from the drawings without creative efforts.

FIG. 12A is a diagram showing a scenario of a map navigation method according to some embodiments.

FIG. 15B is a top view of the mounting of the device of the AR system according to some embodiments.

FIG. 16 is a diagram showing a principle of calculating a target pitch angle according to some embodiments.

FIG. 17 is a diagram showing a principle of extracting a lane line according to some embodiments.

DESCRIPTION OF EMBODIMENTS

To make objectives, technical solutions, and advantages of this application clearer, this application is further described in detail below with reference to drawings and embodiments. It is to be understood that, the specific embodiments described herein are merely used for explaining this application, and are not used for limiting this application.

Figure 1:
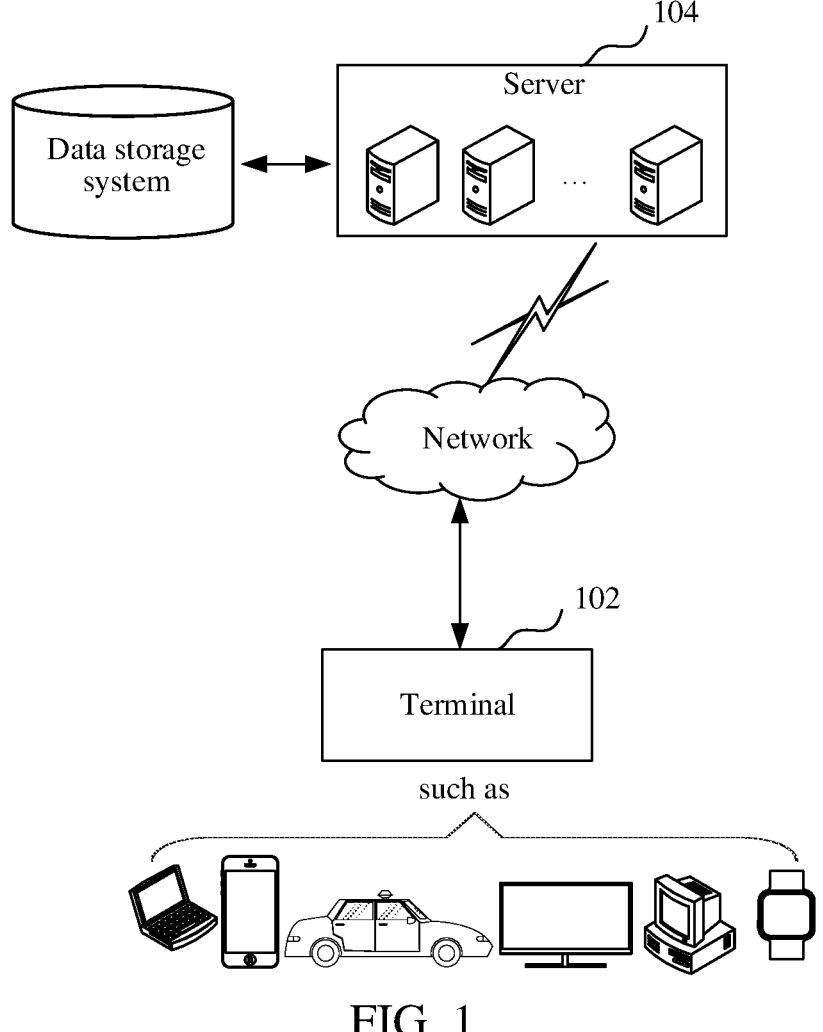
FIG. 1 is a diagram showing an application environment of a map navigation method according to some embodiments.

A map navigation method provided in the embodiments of this application may be applied to an application environment shown in FIG. 1. A terminal 102 communicates with a server 104 through a network. A data storage system can store data that needs to be processed by the server 104. The data storage system may be integrated on the server 104, or may be placed on a cloud or another server. The server 104 may be a server that provides a map service. The map service includes but is not limited to at least one of a positioning service or a navigation service.

The server 104 can receive positioning data about a vehicle or a pedestrian, sensing data about an environment in which the vehicle or the pedestrian is located, and the like. The server 104 can determine a navigation map to be displayed on a navigation interface based on the positioning data or the sensing data, and display the navigation map on the navigation interface through the terminal 102. Certainly, the terminal 102 can also receive the positioning data, the sensing data, and the like about the vehicle or the pedestrian, generate a navigation map based on the positioning data or the sensing data, and display the navigation map on the navigation interface.

Specifically, the terminal 102 displays a navigation interface. The navigation interface is configured to navigate an object moving on a road. When a road segment of the road is in any preset road condition and the object is located in a road range (i.e., a portion of the road) other than the road segment of the road, the terminal 102 displays a first-type navigation map on the navigation interface. When the road segment is in the preset road condition and the object is located within the road segment, the terminal 102 displays a second-type navigation map on the navigation interface. A road segment having the preset road condition may be referred to as a target road segment. A scale used in the second-type navigation map is greater than a scale used in the first-type navigation map.

The terminal 102 may be but is not limited to various desktop computers, notebook computers, smartphones, tablet computers, intelligent voice interaction devices, smart home appliances, on-board terminals, aircrafts, and portable wearable devices. The portable wearable devices may be a smartwatch, a smart bracelet, a headset, or the like. The server 104 may be implemented by an independent server or a server cluster composed of a plurality of servers.

The map navigation method provided in this application may be applied to the field of maps, and may be applied to a vehicle scenario. For example, the map navigation method provided in this application may be performed by an on-board terminal or by the on-board terminal in cooperation with another device.

Figure 2:
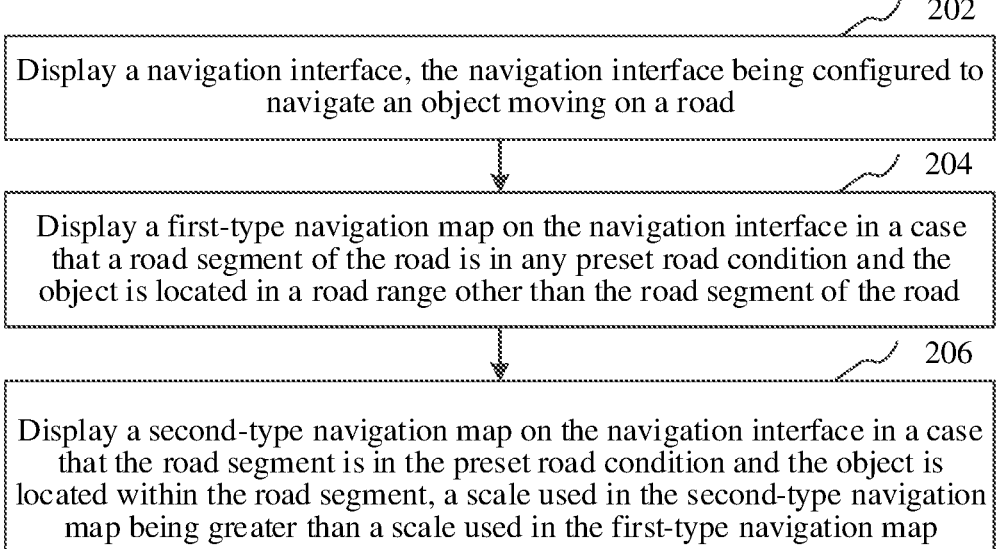
FIG. 2 is a schematic flowchart of a map navigation method according to some embodiments.

In some embodiments, as shown in FIG. 2, a map navigation method is provided. The method may be performed by a terminal, or may be perform jointly by the terminal and a server. A description is provided by using an example in which the method is applied to the terminal 102 in FIG. 1. The method includes the following steps:

Step 202: Display a navigation interface, the navigation interface being configured to navigate an object moving on a road.

The object includes but is not limited to a pedestrian or a vehicle. The vehicle may be driven by a human or a vehicle. Manned driving means that travelling is controlled by a driver, and vehicle driving means that travelling is controlled by an on-board autonomous driving system. The road may be a road of any type, which includes but is not limited to at least one of a motor vehicle lane, a non-motor vehicle lane, or a sidewalk. The navigation interface is displayed through a screen on the terminal. The navigation interface is configured to provide road navigation for the object.

Specifically, the terminal can display a navigation entrance. The navigation entrance is configured to trigger display of the navigation interface. For example, in response to a triggering operation performed on the navigation entrance, the terminal displays the navigation interface, and displays a navigation map on the navigation interface. The navigation map depicts an actual road environment of an actual geographical position of the vehicle, which includes a road in a target lane on which the vehicle is located, a lane, an indicator in the lane, and the like. The navigation map may include at least one of a standard definition (SD) map, a high definition (HD) map, or an augmented reality (AR) map. A ground image in the navigation map may be referred to as a base map.

Figure 3:
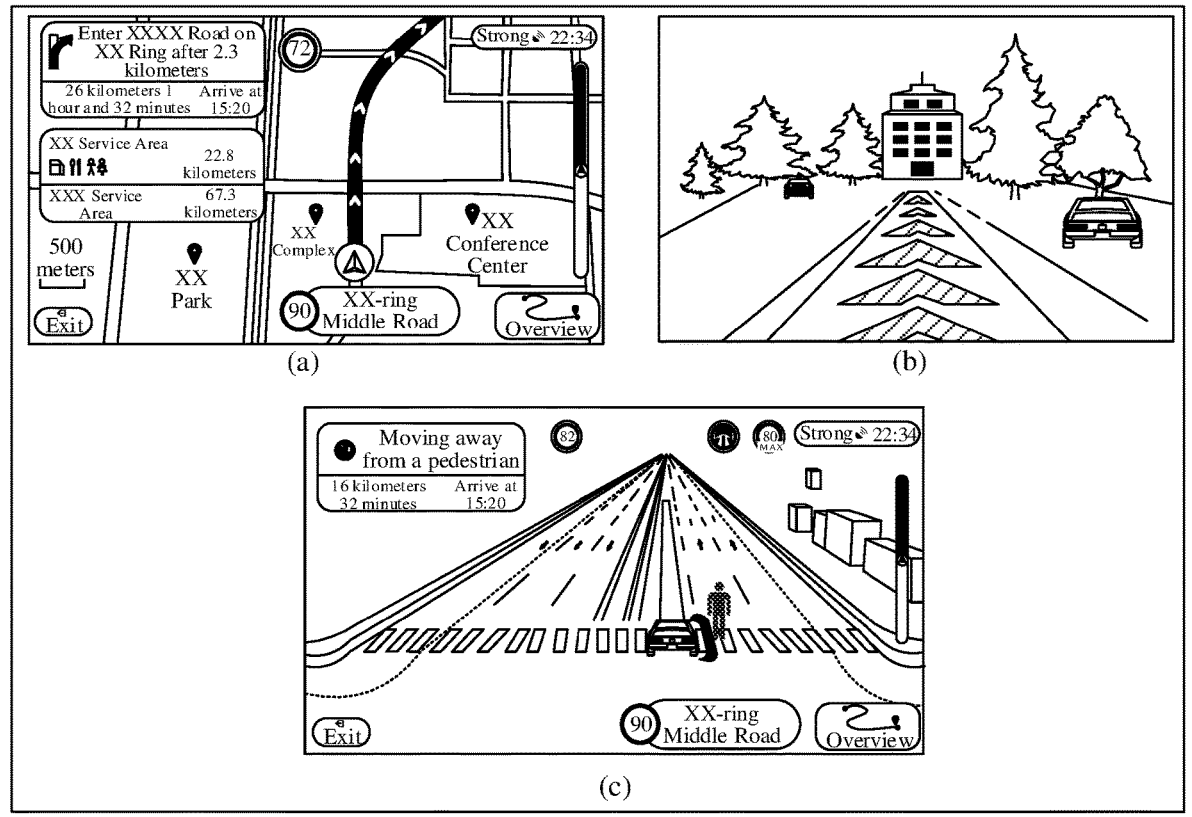
FIG. 3 is a schematic diagram showing a navigation map according to some embodiments.

An SD base map has a poor detail presentation capability, but has an advantage of wide coverage. An AR base map has an excellent detail presentation capability and has the highest degree of reality, but has disadvantages of a single viewing angle and a limited visible range. An HD base map has an equivalent detail presentation capability as the AR base map and has a variable viewing angle, but has a disadvantage of narrow data coverage. The HD base map has a degree of reality lower than that of the AR base map but higher than that of the SD base map. Therefore, in different scenarios, a display ratio is adjusted to highlight different guidance information. A viewing angle of the SD base map is controlled by using an automatic scale policy for normal navigation, a viewing angle of the AR base map depends on a mounting angle of an AR camera, a viewing angle of the HD base map is controlled by using an automatic scale policy for manned driving in a manned driving scenario, and is controlled by using an automatic scale policy for vehicle driving in a vehicle driving scenario. The SD base map is shown in (a) in FIG. 3, the AR base map is shown in (b) in FIG. 3, and the HD base map is shown in (c) in FIG. 3.

Step 204: Display a first-type navigation map on the navigation interface in a case that a road segment of the road is in any preset road condition and the object is located in a road range other than the road segment of the road.

A road segment having the preset road condition may be referred to as a target road segment. The preset road condition is a preset road condition, and is a road condition that has a specific complexity or requires attention to many road details. The preset road condition includes but is not limited to at least one of lane changing, turning, congestion, a ramp, a roundabout, an accompanying route, an endpoint, avoidance, autonomous driving takeover, or a maneuver point. Since manned driving and autonomous driving are both possible when the object is the vehicle, the avoidance may be avoidance in the manned driving scenario or avoidance in the autonomous driving scenario. The avoidance is a scenario in which a dangerous situation is automatically avoided through an action such as deceleration or lane changing when a poor road condition occurs on a current lane as a result of overtaking of a nearby vehicle, deceleration of a front vehicle, lane changing of a front vehicle, and the like during driving. The autonomous driving takeover is a scenario in which a vehicle is about to travel out of an area covered by an autonomous driving function and perform switching to manned driving. The maneuver point may be a maneuver point in a manned driving scenario. For example, the maneuver point is a position in a navigation map for guiding a driver to perform a maneuver such as turning, deceleration, merging into one lane, and travelling out, which is usually a position such as a turning intersection, a shunt intersection, and a merging intersection. The maneuver point may alternatively be an autonomous driving maneuver point. The autonomous driving maneuver point is a position at which a maneuver operation during autonomous driving such as automatic turning and turning around is performed. The road segment having the preset road condition may be referred to as the target road segment. For example, the target road segment may be a road segment at a turning intersection, a congested road segment, a road segment requiring an avoidance measure, or a road segment requiring lane changing.

The navigation map is configured to provide navigation for the object. The navigation map depicts an actual road environment of an actual geographical position of the object, which may include a road on which the object is located, a lane, an indicator in the lane, and the like. The first-type navigation map may be any one of the SD map or the HD map. The road range other than the target road segment includes at least one of a road range in front of the target road segment or a road range behind the target road segment. The target road segment may be a road segment corresponding to the maneuver point. The maneuver point is a position during travelling at which the driver needs to perform an operation such as lane changing, turning, or turning around.

Specifically, when the object is located in the road range other than the target road segment of the road where the object is located, the terminal can display the first-type navigation map on the navigation interface. For example, the terminal can display an SD navigation map on the navigation interface, or display an HD navigation map on the navigation interface.

In some embodiments, when the object is located in the road range other than the target road segment of the road, the terminal can display the first-type navigation map on the navigation interface. The first-type navigation map matches a driving proficiency of a driver. When the driving proficiency of the driver reaches a driving proficiency threshold, the first-type navigation map is an SD map. When the driving proficiency of the driver does not reach the driving proficiency threshold, the first-type navigation map is an HD navigation map.

In some embodiments, when the object is located in the road range other than the target road segment of the road, the terminal can display a first-type navigation map with a specific scale and a specific pitch angle on the navigation interface. When the object is a vehicle, the terminal can determine the scale based on a driving status. The pitch angle is a viewing angle for adjusting the base map. The scale represents a ratio of a distance displayed on the navigation map to an actual geographical distance. For example, if 1 centimeter in the navigation map represents an actual geographical distance of 10000 centimeters, the scale is 1:10000. A mapsheet of the navigation map is negatively correlated with the scale. A smaller scale indicates a larger mapsheet, that is, indicates a larger geographical range presented on the navigation map. A larger scale indicates a smaller mapsheet, that is, indicates a smaller geographical range presented on the navigation map. The mapsheet may be understood as a size of a part of the map displayed on the navigation interface. On a specified screen, increasing the scale is equivalent to amplifying content displayed on the screen, so that less content can be displayed on the screen. In this case, the mapsheet is reduced. The scale corresponds to a scale level. A larger scale level indicates a larger scale, which indicates a smaller mapsheet. Table 1 shows a relationship between the scale level and the mapsheet. Table 1 shows scale levels from a level 4 to a level 22. Each level corresponds to a different scale and pitch angle. A correspondence between the scale level and the mapsheet in Table 1 is merely exemplary. The scale level may alternatively be a decimal. For example, if the scale level is 4.5, a corresponding mapsheet is 1500000 meters.

TABLE 1

| Correspondence between a scale level and a pitch angle | | |
| --- | --- | --- |
| Scale level | Mapsheet/physical size (unit: meter) | Pitch angle range (unit degree) |
| 4 | 2000000 | 0 |
| 5 | 1000000 | |
| 6 | 500000 | |
| 7 | 200000 | |
| 8 | 100000 | |
| 9 | 50000 | |
| 10 | 20000 | |
| 11 | 10000 | |
| 12 | 5000 | |
| 13 | 2000 | |

TABLE 1-continued

Correspondence between a scale level and a pitch angle

| Scale level | Mapsheet/physical size (unit: meter) | Pitch angle range (unit degree) |
|---|---|---|
| 14 | 1000 | |
| 15 | 500 | |
| 16 | 200 | 10 |
| 17 | 100 | 35 |
| 18 | 50 | 45 |
| 19 | 20 | 55 |
| 20 | 10 | 60 |
| 21 | 5 | 65 |
| 22 | 2 | 68 |

Figure 4:
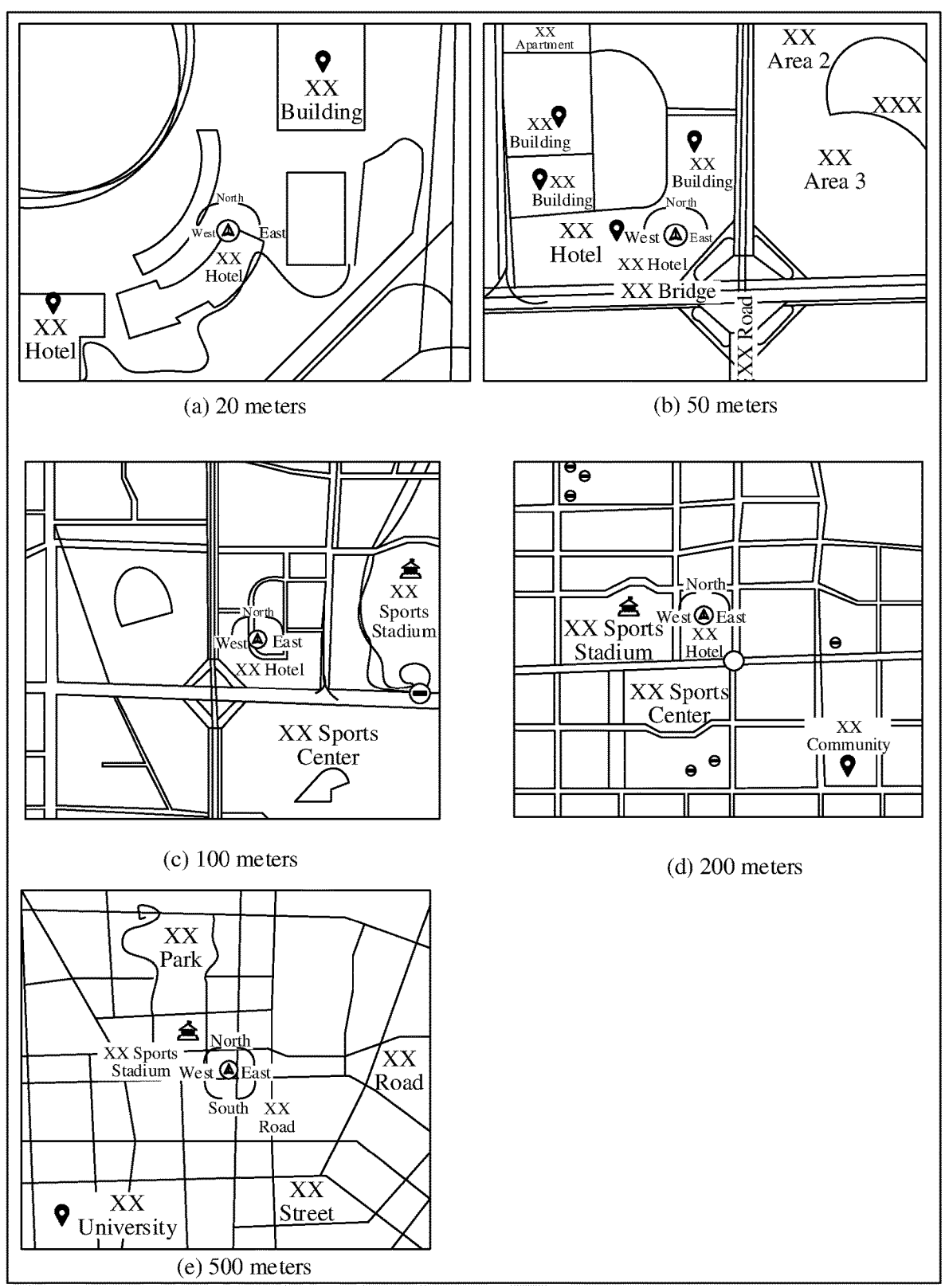
FIG. 4 is a schematic diagram showing a navigation map according to some embodiments.
Figure 5:
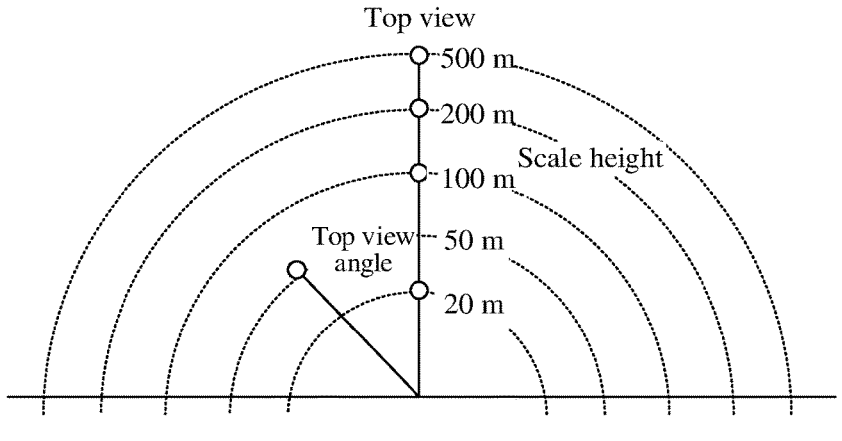
FIG. 5 is a diagram showing a relationship between a scale and a pitch angle according to some embodiments.
Figure 6:
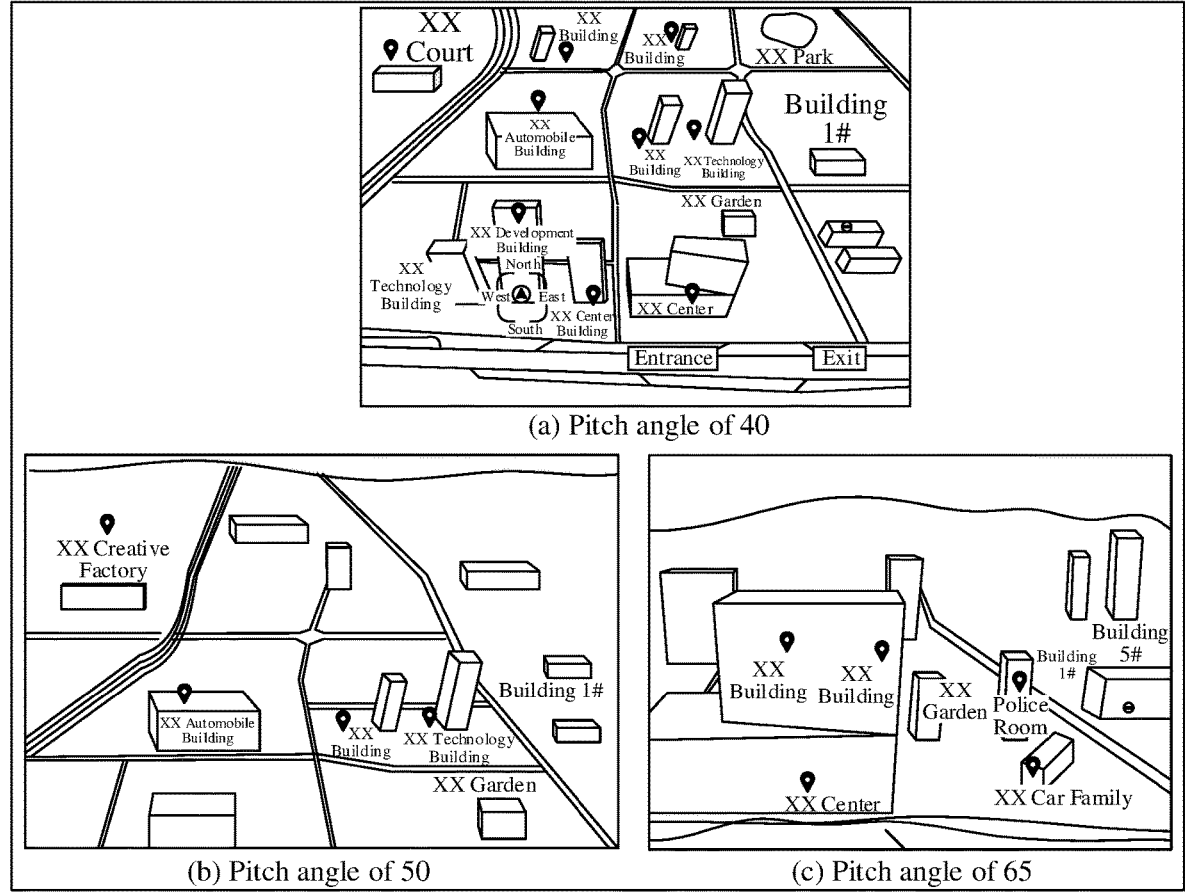
FIG. 6 is a schematic diagram showing a navigation map at different pitch angles according to some embodiments.
Figure 7:
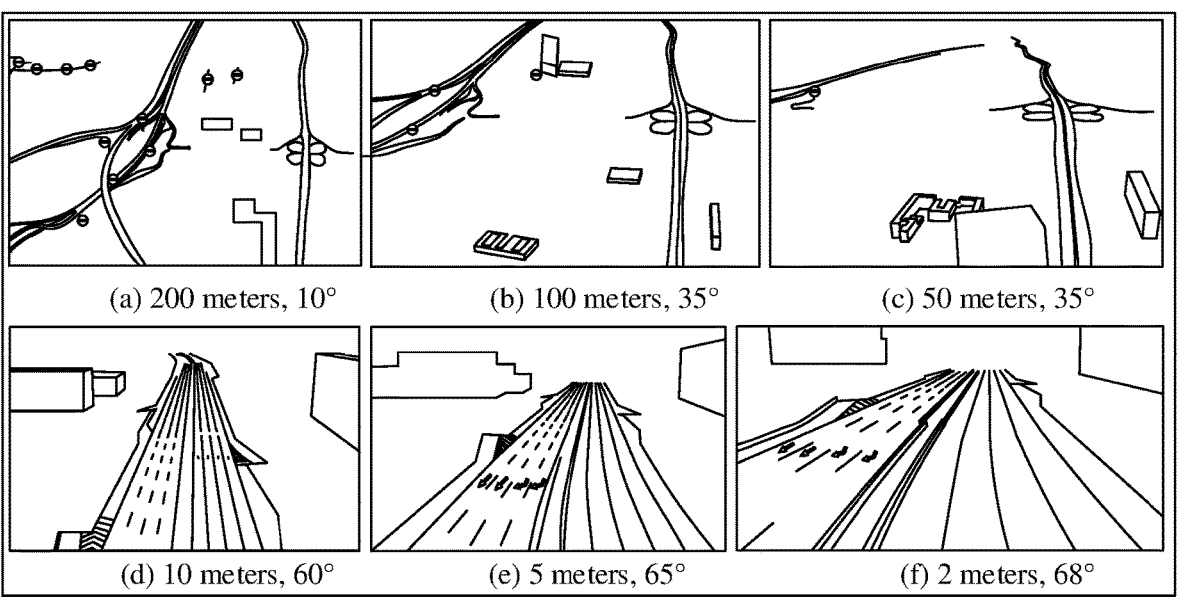
FIG. 7 is a schematic diagram showing a navigation map at different scales according to some embodiments.

Mapsheet ranges presented on the same screen at different scale levels are different. FIG. 4 shows mapsheet effects at the different scale levels. (a) in FIG. 4 shows a mapsheet effect at a scale level of 19, (b) in FIG. 4 shows a mapsheet effect at a scale level of 18, (c) in FIG. 4 shows a mapsheet effect at a scale level of 17, (d) in FIG. 4 shows a mapsheet effect at a scale level of 16, and (e) in FIG. 4 shows a mapsheet effect at a scale level of 15. It may be learned from FIG. 4 that the mapsheet ranges presented on the same screen at different scale levels are different. Map ranges viewed at different scale levels are different. A smaller scale level indicates a larger viewing range and rougher map details. A larger scale level indicates a smaller viewing range and more realistic map details. As shown in FIG. 5, at the same scale level, visible ranges of different orientations may be adjusted through adjustment of the pitch angle. In an automatic mapsheet adjustment policy, a movement direction of the object, for example, a pitch angle of a self-driving vehicle in a driving direction, is adjusted, to increase the visible range, or even to display a beyond-visual-range geographical area. The self-driving vehicle is an autonomous vehicle. FIG. 6 shows rendering effects of a base map at different pitch angles. A pitch angle of (a) in FIG. 6 is 40 degrees, a pitch angle of (b) in FIG. 6 is 50 degrees, and a pitch angle of (c) in FIG. 6 is 65 degrees. HD map data and SD map data are highly consistent, except that the HD map data is finer and has more data dimensions. FIG. 7 shows an effect of HD map data plotted on an SD base map. It may be learned from FIG. 7 that the HD map data has greatly differing effects at different scale levels. Effective guidance can be achieved only when a scale level of the base map is greater than or equal to a level of 20, thereby achieving lane level guidance.

Step 206: Display a second-type navigation map on the navigation interface in a case that the road segment is in the preset road condition and the object is located within the road segment, a scale used in the second-type navigation map being greater than a scale used in the first-type navigation map.

In some embodiments, a road degree-of-reality (i.e., a degree of reality of roads) in the second-type navigation map is higher than a road degree-of-reality in the first-type navigation map. The road degree-of-reality in the navigation map is used for reflecting a degree of similarity between a road in the navigation map and a real road. A larger degree of similarity between the road in the navigation map and the real road indicates a larger road degree-of-reality in the navigation map. Since the road degree-of-reality in the second-type navigation map is higher than the road degree-of-reality in the first-type navigation map, a road degree-of-reality in the navigation map used within the target road segment is higher than a road degree-of-reality in the navigation map used outside the target road segment, which can provide more road details within the target road segment, thereby improving navigation efficiency.

For ease of understanding a road degree-of-reality, a description is provided by using an example. For example, a navigation map including a real scene is generated from images of a real scene of a front road captured by a camera in real time, and the navigation map includes the real scene of the road, but an electronic map is not generated from images of a real scene of a front road captured by a camera in real time, and does not include the real scene of the road. Therefore, compared to a road in the electronic map, a road in the real scene navigation map has a larger degree of similarity with the real road. In other words, a road degree-of-reality is higher. The real scene navigation map is, for example, an AR map, and the electronic map is, for example, an SD map or an HD map. Since the AR map is generated from images of a real scene of a front road captured by a camera in real time, and the SD map and the HD map are electronic maps not generated from images of a real scene of a front road captured by a camera in real time, it is apparent that, compared to roads in the SD map and the HD map, a road in the AR map has a larger degree of similarity with a real road. Therefore, a road degree-of-reality in the AR map is greater than a road degree-of-reality in the SD map, and the road degree-of-reality in the AR map is greater than a road degree-of-reality in the HD map.

For another example, for electronic maps, if road display precisions are different, richnesses of presented road details are different, and degrees of similarity with the real road are also different. It may be understood that, an electronic map with a higher road display precision presents richer road details, and thereby has a higher degree of similarity with the real road. Therefore, electronic maps with different road display precisions have different road degrees of reality. For example, since the HD map presents richer road details than the SD map, the road degree-of-reality in the HD map is greater than the road degree-of-reality in the SD map.

Since the road degree-of-reality in the second-type navigation map is higher than the road degree-of-reality in the first-type navigation map, the second-type navigation map may be a real scene navigation map, and the first-type navigation map may be an electronic map. For example, the second-type navigation map is an AR map, and the first-type navigation map is either an SD map or an HD map. Alternatively, the first-type navigation map and the second-type navigation map may be electronic maps. For example, the second-type navigation map is an HD map, and the first-type navigation map is an SD map.

The scale of the second-type navigation map is greater than the scale of the first-type navigation map, and the road degree-of-reality in the second-type navigation map is higher than the road degree-of-reality in the first-type navigation map. The second-type navigation map is a map that can present a real environment, for example, may be a navigation map in the form of the AR map. The scale of the first-type navigation map belongs to a first scale range, and the scale of the second-type navigation map may belong to a second scale range. The first scale range is different from the second scale range. A scale level corresponding to a scale in the first scale range is greater than a scale level of a scale in the second scale range. For example, the first scale range is a scale range composed of scales with levels of 4 to 21, and the second scale range is a scale range composed of scales with levels greater than or equal to a level of 22.

Specifically, when the object is located within the target road segment, the terminal can display the second-type navigation map on the navigation interface. For example, the terminal can display a navigation map in the form of the AR map on the navigation interface.

In some embodiments, the first-type navigation map and the second-type navigation map both may be electronic maps, and the road degree-of-reality in the second-type navigation map is higher than the road degree-of-reality in the first-type navigation map. For example, the first-type navigation map is an SD map, and the second-type navigation map is an HD map. When the object is located in the road range other than the target road segment of the road, the SD map is displayed on the navigation interface. When the object is located within the target road segment, the HD map is displayed on the navigation interface.

In some embodiments, the first-type navigation map is an electronic map, the second-type navigation map is a real scene navigation map, and the road degree-of-reality in the second-type navigation map is higher than the road degree-of-reality in the first-type navigation map. For example, the first-type navigation map is an SD map, and the second-type navigation map is an AR map. When the object is located in the road range other than the target road segment of the road, the SD map is displayed on the navigation interface. When the object is located within the target road segment, the AR map is displayed on the navigation interface. Alternatively, the first-type navigation map is an HD map, and the second-type navigation map is an AR map. When the object is located in the road range other than the target road segment of the road, the HD map is displayed on the navigation interface. When the object is located within the target road segment, the AR map is displayed on the navigation interface.

Figure 8:
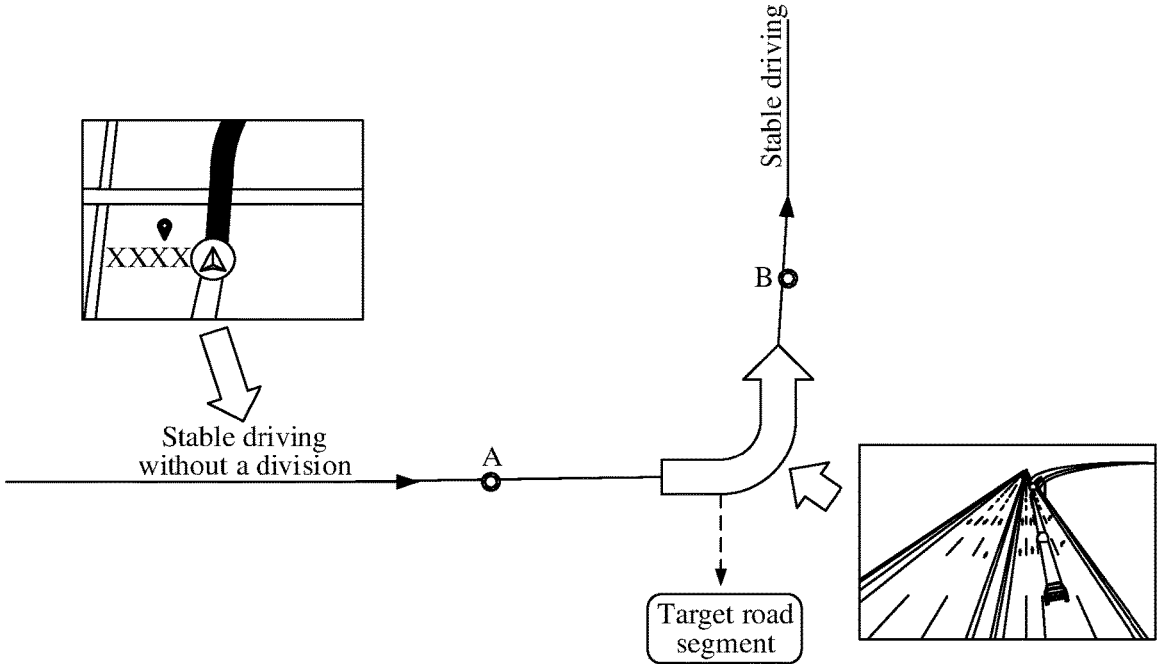
FIG. 8 is a diagram showing a scenario of a map navigation method according to some embodiments.

In some embodiments, if the object is located on the road outside the target road segment and moves toward the target road segment, switching of the navigation map may be triggered before the object enters the target road segment. Specifically, in response to a distance between the object and the target road segment being less than a preset target distance, the terminal performs switching from display of the first-type navigation map to display of the second-type navigation map, that is, starts displaying the second-type navigation map before the object enters the target road segment. In response to the object moving out of the target road segment, the terminal performs switching from display of the second-type navigation map to display of the first-type navigation map. The preset target distance may be determined based on a movement velocity of the object. A larger movement velocity of the object indicates a larger preset target distance, and a smaller movement velocity of the object indicates a smaller preset target distance. An example in which the first-type navigation map is an SD map and the second-type navigation map is an HD map is used. As shown in FIG. 8, the target road segment may be, for example, a turning intersection shown in FIG. 8. A distance between a point A and the turning intersection is a preset target distance. When the object moves to the point A, switching from display of the SD map to display of the HD map is triggered. In some other embodiments, the switching of the navigation map may be triggered when the object enters the target road segment. For example, in response to the object entering the target road segment, the terminal performs the switching from display of the first-type navigation map to display of the second-type navigation map.

In some embodiments, in response to the object moving into the target road segment from outside of the target road segment, the terminal performs the switching from display of the first-type navigation map to display of the second-type navigation map. The switching of the navigation map may be caused by a change of the scale. Specifically, the terminal increases the scale to a scale in the second scale range in response to the object moving into the target road segment from the outside of the target road segment, and performs the switching from display of the first-type navigation map to display of the second-type navigation map in response to the scale being increased to the scale in the second scale range.

In some embodiments, the object travels toward the target road segment. When the object is located in the road range other than the target road segment of the road, the terminal reduces a mapsheet of the first-type navigation map displayed on the navigation interface, that is, increases the scale of the first-type navigation map displayed on the navigation interface in response to the object moving toward the target road segment on the road, that is, in response to an event that the distance between the object and the target road segment decreases. When the terminal determines that the object enters the target road segment based on the distance between the object and the target road segment, the terminal displays the second-type navigation map on the navigation interface. The scale of the second-type navigation map is greater than the scale of the first-type navigation map, that is, a mapsheet of the second-type navigation map is less than that of the first-type navigation map.

In some embodiments, the object travels away from the target road segment. When the object is located within the target road segment, the second-type navigation map is displayed on the navigation interface. When the terminal determines that the object moves out of the target road segment based on the distance between the object and the target road segment, the terminal displays the first-type navigation map on the navigation interface.

In some embodiments, when only the first-type navigation map and the second-type navigation map exist on the terminal, the terminal displays the first-type navigation map on the navigation interface when the object is located at any place in the road range other than the target road segment of the road, and displays the second-type navigation map on the navigation interface when the object is located within the target road segment.

In some embodiments, when the object is located in the road range other than the target road segment of the road, and the distance between the object and the target road segment is greater than or equal to a second preset distance, the terminal displays the first-type navigation map on the navigation interface. When the object is located within the road range other than the target road segment of the road, and the distance between the object and the target road segment is less than the second preset distance, the terminal displays a third-type navigation map on the navigation interface. When the object is located within the target road segment, the terminal displays the second-type navigation map on the navigation interface. A road display precision of the third-type navigation map is greater than a road display precision of the first-type navigation map, and the road degree-of-reality in the second-type navigation map is higher than a road degree-of-reality in the third-type navigation map. For example, the first-type navigation map is an SD map, the second-type navigation map is an AR map, and the third-type navigation map is an HD map. In this embodiment of this application, a process of switching between base maps in a plurality of modes is actually implemented. The plurality of modes mean a plurality of types. The plurality of types mean at least two types.

In some embodiments, switching from the third-type navigation map to the second-type navigation map is triggered when the object enters the target road segment. Alternatively, switching from the third-type navigation map to the second-type navigation map may be performed before the object enters the target road segment. Specifically, when the distance between the object and the target road segment is less than the second preset distance and greater than a third preset distance, the terminal can display the third-type navigation map. In response to the distance between the object and the target road segment decreasing to the third preset distance, the terminal performs switching from the third-type navigation map to the second-type navigation map. When the distance between the object and the target road segment decreases to the third preset distance, as the object moves toward the target road segment, the terminal maintains the display of the second-type navigation map, and performs switching of the navigation map type when the object moves from the target road segment or the object moves out of the target road segment by a specific distance. The third preset distance is less than the second preset distance.

Figure 9A:
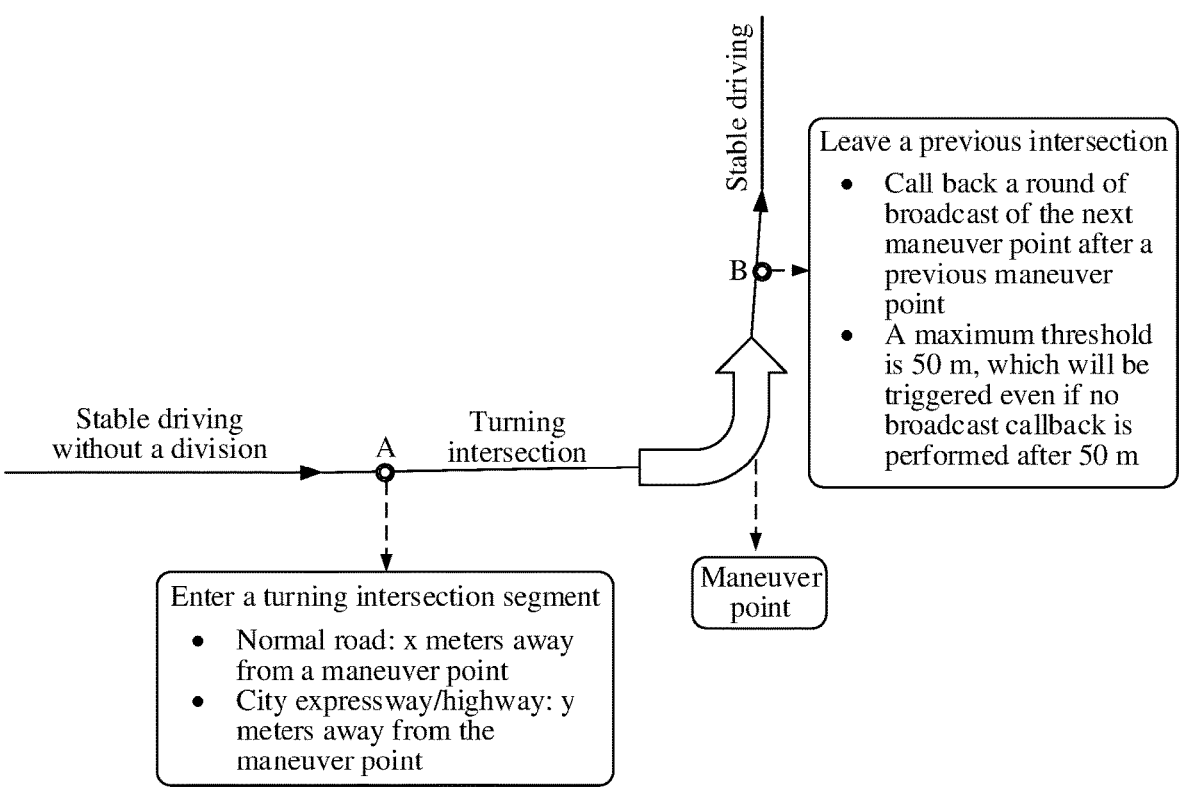
FIG. 9A is a diagram showing a scenario of a map navigation method according to some embodiments.
Figure 9B:
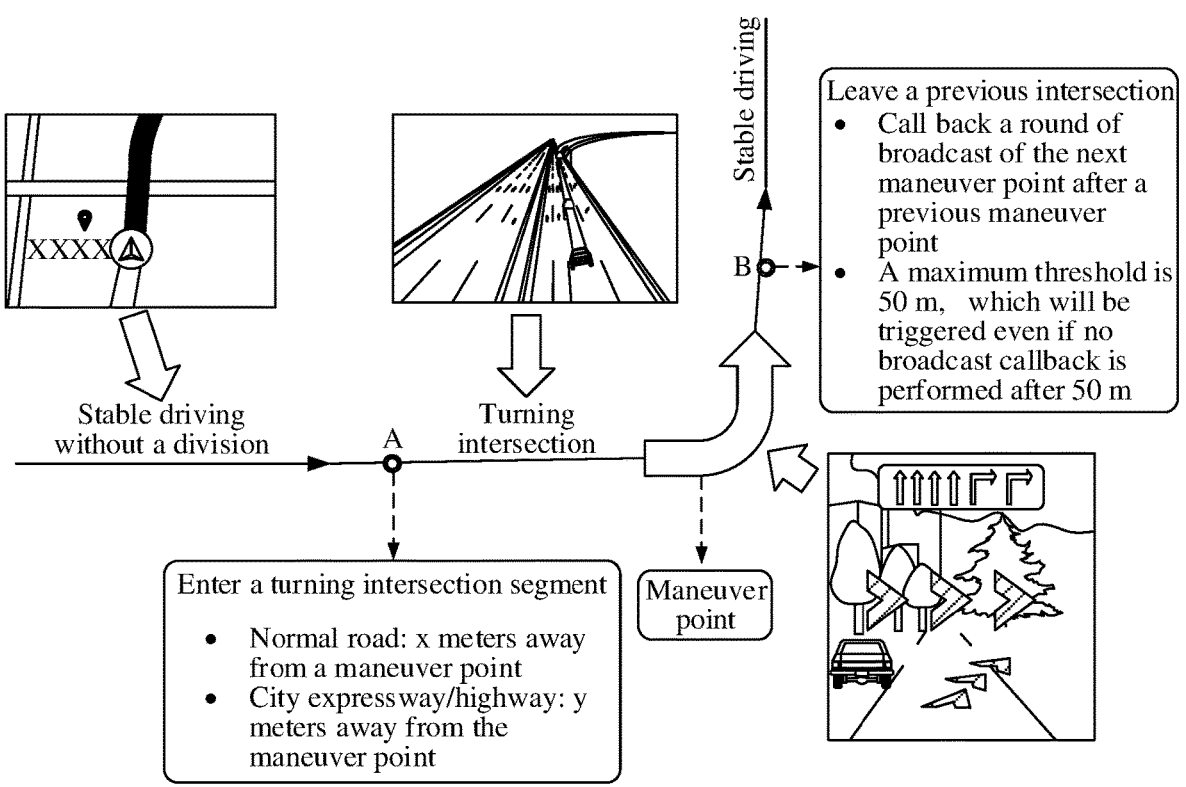
FIG. 9B is a diagram showing the scenario of the map navigation method according to some embodiments.

A description is provided by using an example in which the first-type navigation map is a navigation map in the form of the SD map, the second-type navigation map is a navigation map in the form of the AR map, and the third-type navigation map is a navigation map in the form of the HD map. As shown in FIG. 9A and FIG. 9B, the process of switching between the base maps in the plurality of modes is described by using an entire process including for components: before the vehicle enters a maneuver point, when the vehicle enters the maneuver point, after the vehicle enters the maneuver point, and when the vehicle exits the maneuver point as an example. Before entering the maneuver point, the vehicle is on a stable driving road segment without a division. The stable driving road segment without a division is, for example, a road segment before a point A in FIG. 9A or FIG. 9B. The stable driving road segment without a division requires a driver to maintain driving on a current lane without other guidance. The driver pays more attention to global route information, for example, to a distance to a next maneuver point, a distance to and a time required for arriving at a destination, and a front road condition. For the stable driving road segment without a division, an SD base map with a large mapsheet is displayed, and global navigation information is displayed by using the SD base map. On the stable driving road segment without a division, roads of different types are displayed at different scale levels. For example, for a normal road, an SD base map is displayed at a scale level L1, and for a highway or a city expressway, an SD base map is displayed at a scale level L2. The scale level L1 is lower than the scale level L2. To be specific, a mapsheet corresponding to the scale level L2 is less than a mapsheet corresponding to the scale level L1. For example, L1 is a level of 4, and L2 is a level of 6.

When travelling to the point A in FIG. 9A or FIG. 9B, the vehicle enters a turning intersection segment and enters a stage of entering the maneuver point. After entering the turning intersection segment, the driver needs to pay attention to a surrounding road condition, and prepare for and start to perform switching to a target lane. On the turning intersection segment, a mapsheet scale is dynamically adjusted based on a position of the self-driving vehicle and a distance to the maneuver point. When the mapsheet scale reaches an HD display level, switching from display of the SD base map to displaying the HD base map that can show more details is performed, to display more details. For roads of different types, manners of determining whether to enter the turning intersection segment are different. For example, if a distance between the self-driving vehicle and the maneuver point on the highway or the city expressway is x meters, it is determined to enter the turning intersection segment. If a distance between the self-driving vehicle and the maneuver point on the normal road is y meters, it is determined to enter the turning intersection segment. x is greater than y.

When a turning intersection, that is, the maneuver point, is about to be arrived, the driver is required to turn to a next road. In order to provide more realistic guidance for a user, when the vehicle has entered the turning intersection segment and the distance between the vehicle and the maneuver point is less than or equal to z meters, switching from display of the HD base map to display of the AR base map that provides more guidance is performed, to guide the user to perform turning through the AR base map. In other words, the AR base map is displayed provided that the vehicle has entered the turning intersection segment and a segment between the vehicle and the maneuver point less than or equal to z meters is determined as the AR base map display road segment. When data about a next maneuver point is received after the object passes through a waypoint, that is, the maneuver point, the AR base map is closed. If new guidance data, for example, the data about the next maneuver point, is not received after the vehicle passes through an intersection and moves by m meters, a mapsheet of the base map is adjusted.

In the above map navigation method, the navigation interface is displayed, the navigation interface being configured to perform road navigation for the object; when the object is located in the road range other than the target road segment of the road, the first-type navigation map is displayed on the navigation interface, the target road segment being the road segment having the preset road condition; and when the object is located within the target road segment, the second-type navigation map is displayed on the navigation interface. Since the scale of the second-type navigation map is greater than the scale of the first-type navigation map, and the road degree-of-reality in the second-type navigation map is higher than the road degree-of-reality in the first-type navigation map, display of the navigation map can be automatically controlled based on a road condition, and advantages of the navigation maps of different types are fully exploited, which improves navigation efficiency. Since the scale of the second-type navigation map is greater than the scale of the first-type navigation map, a map presented within the road segment have more details than a map presented outside the road segment. Since presenting more details within the road segment facilitates more effective presentation of the preset road condition, the navigation efficiency is improved. Since the scale of the second-type navigation map is greater than the scale of the first-type navigation map, a mapsheet of a map displayed outside the road segment is greater than a mapsheet of a map displayed within the road segment. Since providing a relatively large mapsheet outside the road segment allows more map content to be displayed, more information of a front road can be presented, thereby improving the navigation efficiency.

Figure 10A:
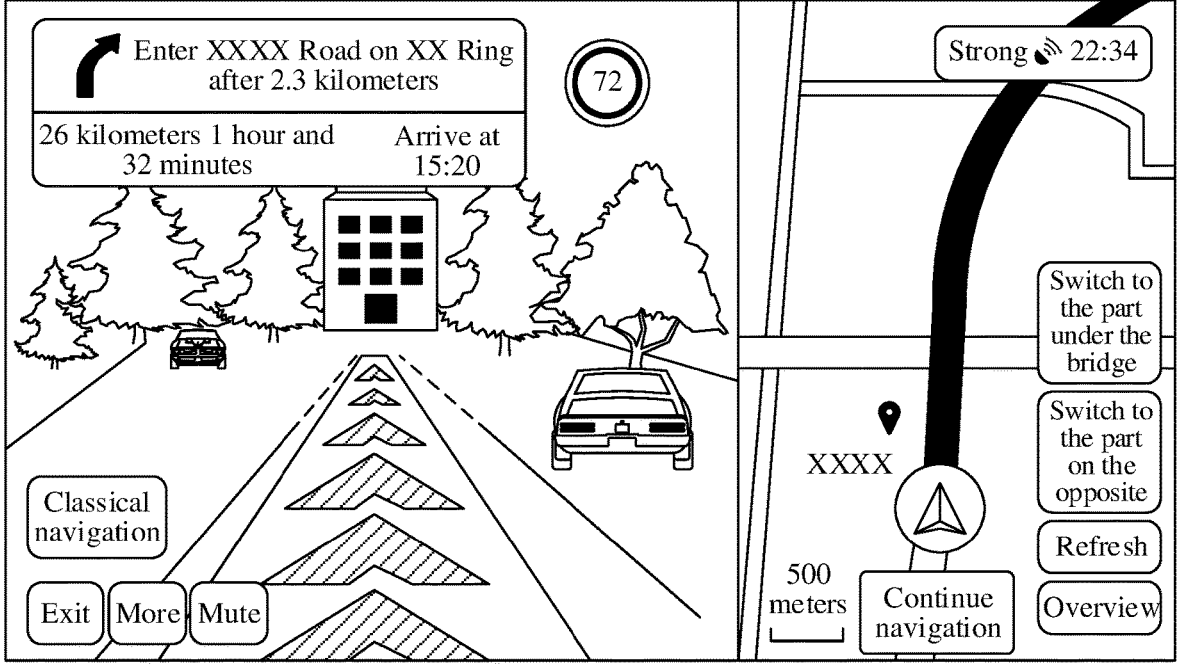
FIG. 10A is a diagram showing an effect of split-screen display of augmented reality (AR) and standard definition (SD) according to some embodiments.
Figure 10B:
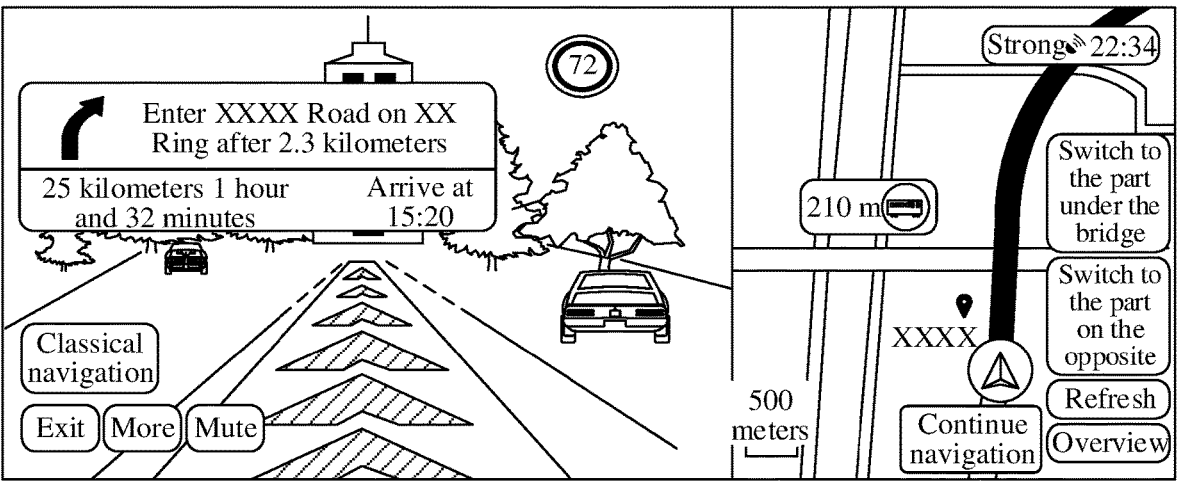
FIG. 10B is a diagram showing an effect of split-screen display of AR and SD according to some embodiments.
Figure 10C:
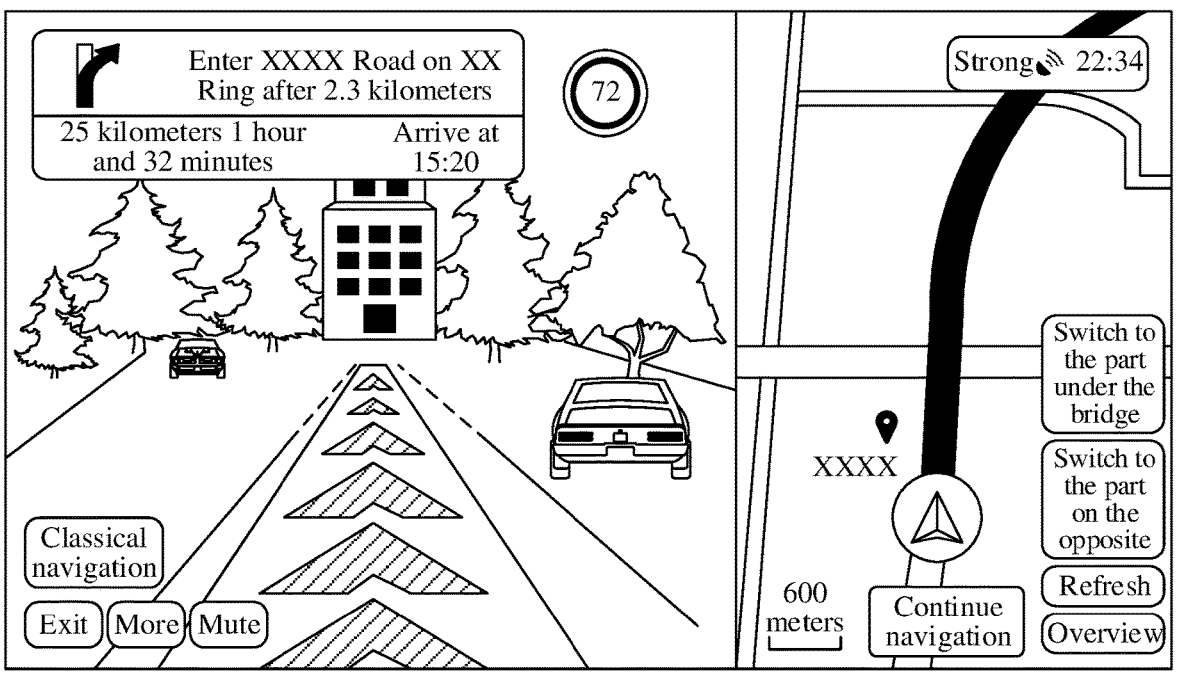
FIG. 10C is a diagram showing an effect of split-screen display of AR and SD according to some embodiments.
Figure 10D:
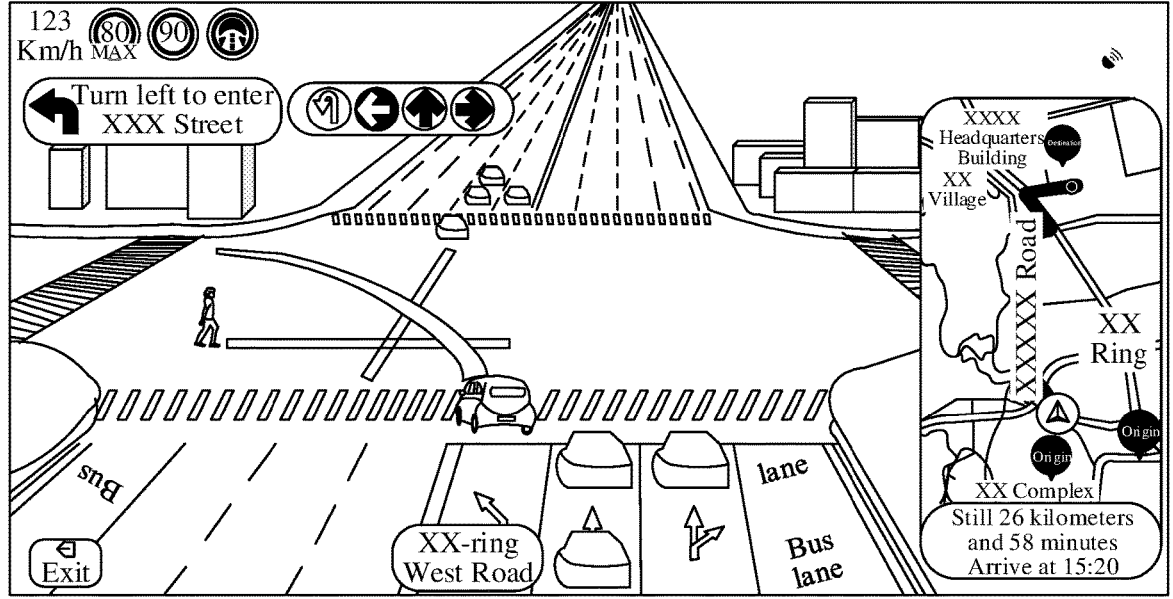
FIG. 10D is a diagram showing an effect of split-screen display of high definition (HD) and SD according to some embodiments.
Figure 10E:
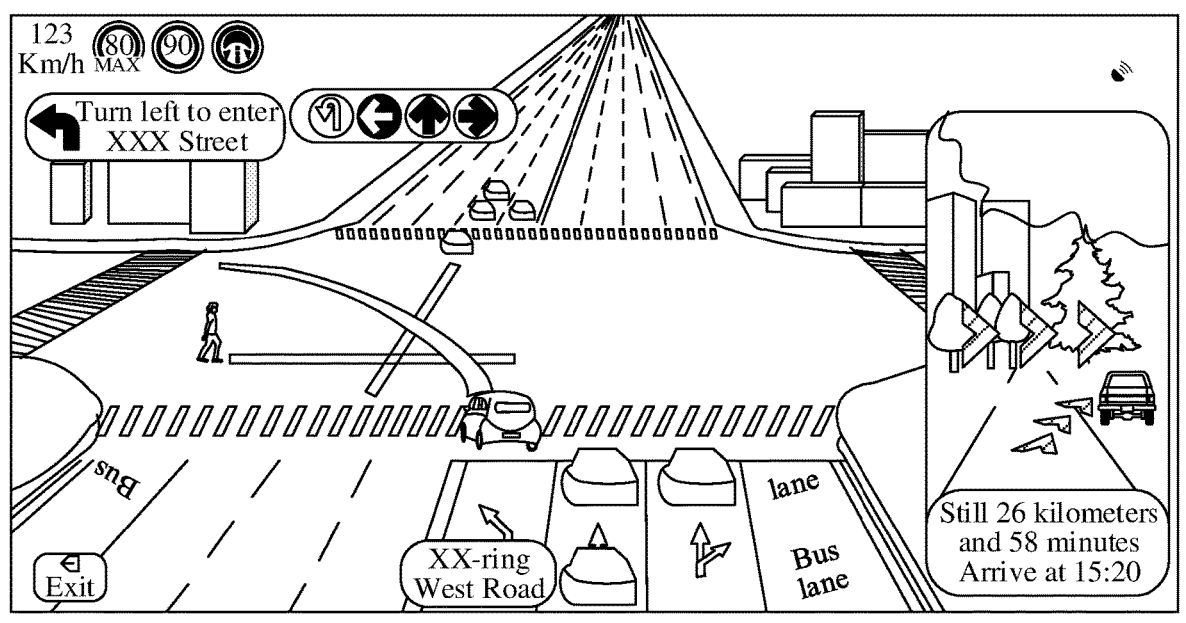
FIG. 10E is a diagram of an effect of split-screen display of HD and AR according to some embodiments.

Currently, a navigation map has a plurality of presentation modes, which include but are not limited to an SD mode, an AR mode, and an HD mode. Product policies for different presentation mode differ. FIG. 10A, FIG. 10B, and FIG. 10C show split-screen effects of AR and SD presented on screens of different sizes. FIG. 10A shows a split-screen effect of AR and SD presented on a screen with a resolution of 1280×720. FIG. 10B shows a split-screen effect of AR and SD presented on a screen with a resolution of 1920×720. FIG. 10C shows a split-screen effect of AR and SD presented on a screen with a resolution of 1920×1080. Sizes of an SD map breadth and sizes of an AR map breadth on different screens are different. FIG. 10D shows a split-screen display effect of HD and SD. FIG. 10E shows a split-screen display effect of HD and AR. A split-screen solution for HD and SD is not exactly the same as a split-screen solution for AR and SD. It may be learned from FIG. 10D and FIG. 10E that, due to different forms of and different split-screen policies for base map products, an effect of fusing maps in a plurality of modes is relatively poor, which has an apparent split-screen effect. From a perspective of a product form, a user is required to have a high understanding ability, and understanding costs are relatively high. From a technical perspective, effects of the different forms need to be implemented through different technology stacks, resulting in relatively high implementation costs and maintenance costs. In the map navigation method provided in this application, the product form and the technical implementation are taken into comprehensive consideration, which implements a uniform, efficient, and stable, multi-mode fusion solution with a high fusion degree, thereby improving the navigation efficiency. In some embodiments, the first-type navigation map is displayed by using a scale in the first scale range, and the second-type navigation map is displayed by using a scale in the second scale range. The scale in the second scale range is greater than the scale in the first scale range.

The first scale range and the second scale range are preset. The scale in the second scale range is greater than the scale in the first scale range. The first-type navigation map is displayed when the scale in the first scale range is used, and the second-type navigation map is displayed when the scale in the second scale range is used.

Specifically, when the object is located in the road range other than the target road segment of the road, the first-type navigation map is displayed on the navigation interface by using the scale in the first scale range. When the object is located within the target road segment, the second-type navigation map is displayed on the navigation interface by using the scale in the second scale range. The scale in the second scale range is greater than the scale in the first scale range.

In some embodiments, the first-type navigation map is a navigation map in the form of the SD map, and the second-type navigation map is a navigation map in the form of the AR map. When the object is located in the road range other than the target road segment of the road, the navigation map in the form of the SD map is displayed on the navigation interface by using the scale in the first scale range. When the object is located within the target road segment, the navigation map in the form of the AR map is displayed on the navigation interface by using the scale in the second scale range.

In some embodiments, the first-type navigation map is a navigation map in the form of the HD map, and the second-type navigation map is a navigation map in the form of the AR map. When the object is located in the road range other than the target road segment of the road, the navigation map in the form of the HD map is displayed on the navigation interface by using the scale in the first scale range. When the object is located within the target road segment, the navigation map in the form of the AR map is displayed on the navigation interface by using the scale in the second scale range.

In this embodiment, since the scale in the second scale range is greater than the scale in the first scale range, navigation maps of different types are displayed in different scale ranges. Within the target road segment, a large scale is used, which can display more details in a map, so that a condition of the target road segment can be more easily learned, thereby improving the navigation efficiency. On a road relatively far from the target road segment, that is, on a stable road segment without a division, a small scale is used, that is, a larger mapsheet may be used to display a larger range of the map, so that a position of the object can be learned from a global perspective, to adapt to a navigation requirement, thereby improving the navigation efficiency.

In some embodiments, the displaying a first-type navigation map on the navigation interface in a case that a road segment of the road is in any preset road condition and the object is located in a road range other than the road segment of the road includes: gradually reducing, in response to the object moving on the road toward the road segment, a mapsheet displayed on the first-type navigation map on the navigation interface by using gradually increasing scales within the first scale range in a case that the road segment of the road is in any preset road condition and the object is located in the road range other than the road segment of the road.

Specifically, when the object is located in the road range other than the target road segment of the road, the terminal gradually reduces the mapsheet of the first-type navigation map on the navigation interface in response to the object moving toward the target road segment on the road. A scale corresponding to the mapsheet of the first-type navigation map belongs to the first scale range.

In some embodiments, when the object is located in the road range other than the target road segment of the road, the terminal gradually increases the scale of the first-type navigation map displayed on the navigation interface in response to the object moving toward the target road segment of the road, that is, as the distance between the object and the target road segment decreases, so that the mapsheet of the first-type navigation map on the navigation interface gradually decreases.

In some embodiments, the object is a target vehicle. The terminal can determine a rate for increasing the scale based on a driving status. The driving status includes but is not limited to at least one of a travelling velocity, manned driving, autonomous driving, or a road condition. For example, the terminal can detect a travelling velocity of the target vehicle, and determine the rate for increasing the scale based on the travelling velocity. For example, a larger travelling velocity indicates a larger rate for increasing the scale.

In this embodiment, in response to the object moving toward the road segment on the road, the mapsheet for displaying the first-type navigation map on the navigation interface is gradually reduced by using the gradually increasing scales within the first scale range. Therefore, when the object moves toward the target road segment on the road, the mapsheet is gradually reduced, that is, the scale is gradually increased, so that the scale gradually approaches the scale in the second scale range. In this way, when the object moves into the target road segment from the outside of the target road segment, the scale can be smoothly switched, which reduces visual discomfort caused by a relatively big change in the scale, thereby reducing interference during the navigation, and improving the navigation efficiency.

In some embodiments, the displaying a second-type navigation map on the navigation interface in a case that the road segment is in the preset road condition and the object is located within the road segment includes: performing switching from the scale in the first scale range to the scale in the second scale range and performing switching from the first-type navigation map displayed on the navigation interface to the second-type navigation map in response to the object moving into the road segment from outside of the road segment on the road.

Specifically, the terminal displays the second-type navigation map on the navigation interface by using the scale in the second scale range in response to the object moving into the target road segment from the outside of the target road segment.

In some embodiments, the terminal performs switching from display of the first-type navigation map on the navigation interface by using the scale in the first scale range to display of the second-type navigation map on the navigation interface by using the scale in the second scale range in response to the object moving into the target road segment from the outside of the target road segment.

In this embodiment, in response to the object moving into the road segment from the outside of the road segment on the road, switching from the scale in the first scale range to the scale in the second scale range is performed, and switching from the first-type navigation map displayed on the navigation interface to the second-type navigation map is performed, so that more road details can be presented within the road segment, thereby reducing interference on the road segment, and improving the navigation efficiency.

In some embodiments, the performing switching from the scale in the first scale range to the scale in the second scale range and performing switching from the first-type navigation map displayed on the navigation interface to the second-type navigation map in response to the object moving into the road segment on the road from outside of the road segment includes: playing, on the navigation interface in response to the object moving into the road segment on the road from outside of the road segment, a first transition animation presenting transition from the first-type navigation map to the second-type navigation map, a visibility of the first-type navigation map gradually decreasing and a visibility of the second-type navigation map gradually increasing with playback of the first transition animation; and performing switching from the scale in the first scale range to the scale in the second scale range and displaying the second-type navigation map on the navigation interface after the first transition animation ends.

The first transition animation is configured to present a process of the switching from the first-type navigation map to the second-type navigation map. For example, if the first-type navigation map is an SD map, and the second-type navigation map is an AR map, the first transition animation is configured to present a process of switching from the SD map to the AR map. If the first-type navigation map is an HD map, and the second-type navigation map is an AR map, the first transition animation is configured to present a process of switching from the HD map to the AR map. With the playback of the first transition animation, the visibility of the first-type navigation map gradually decreases, and the visibility of the second-type navigation map gradually increases.

Specifically, the first transition animation may be obtained through fusion of an image of the first-type navigation map and an image of the second-type navigation map. For example, for a plurality of moments in the switching process, the terminal can fuse an image of the first-type navigation map at each moment with an image of the second-type navigation map at the moment in an Alpha fusion manner, to obtain a fused image at the moment, and fuse the fused images at all moments to generate the first transition animation. The Alpha fusion manner is a method of fusing two images by using a transparency image. The terminal can determine a transparency image at each moment. A pixel value of each pixel in the transparency image represents a transparency, and pixel values of all pixels in the transparency image are the same. The pixel value, that is, the transparency, increases as a time increases. Since the pixel value represents the transparency, a value range of the pixel value is 0 to 1. The terminal can obtain the image of the first-type navigation map at each moment and denote the image as a first image, obtain the image of the second-type navigation map at the moment and denote the image as a second image, and determine a transparency image at the moment. The first image is fused with the second image by using the transparency image to obtain a fused image at the moment. Sizes of the first image, the second image, and the transparency image are the same. For each pixel position, the terminal can use a pixel value at the pixel position in the transparency image as a weight of a pixel value at the pixel position in the second image, and a difference between the pixel value at the pixel position in the transparency image and 1 as a weight of a pixel value at the pixel position in the first image. Weighted calculation is performed on the weights of the two pixel values at the pixel position to obtain a fused pixel value at the pixel position. The fused image at the moment is generated based on the fused pixel values at all pixel positions at the moment. Since the pixel value, that is, the transparency, in the transparency image increases as the time increases, the first image of the fused image has decreasing content, and the second image has increasing content. Therefore, with the playback of the first transition animation, the visibility of the first-type navigation map gradually decreases, and the visibility of the second-type navigation map gradually increases.

In some embodiments, the terminal plays a transition animation presenting transition from the second-type navigation map to the first-type navigation map in response to the object moving out of the target road segment from inside of the target road segment. With the playback of the transition animation, the visibility of the second-type navigation map gradually decreases, and the visibility of the first-type navigation map gradually increases.

Figure 11A:
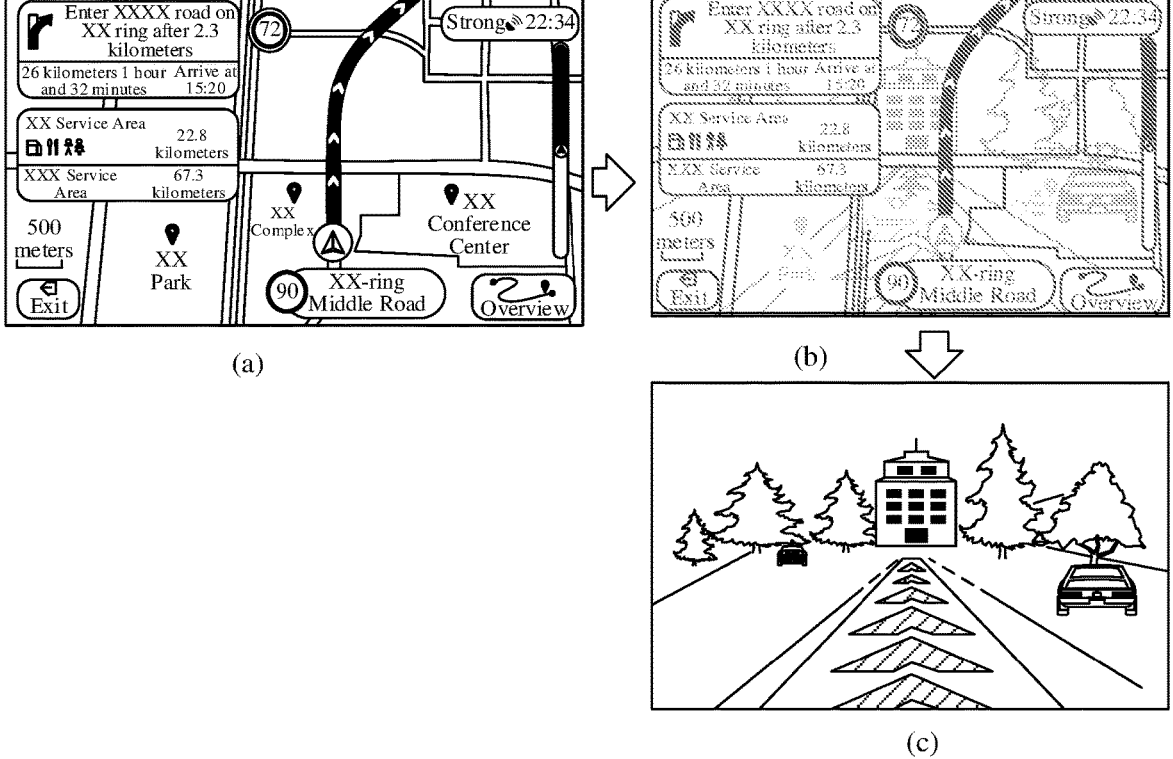
FIG. 11A is a schematic diagram showing switching from an SD base map to an AR base map according to some embodiments of this application.
Figure 11B:
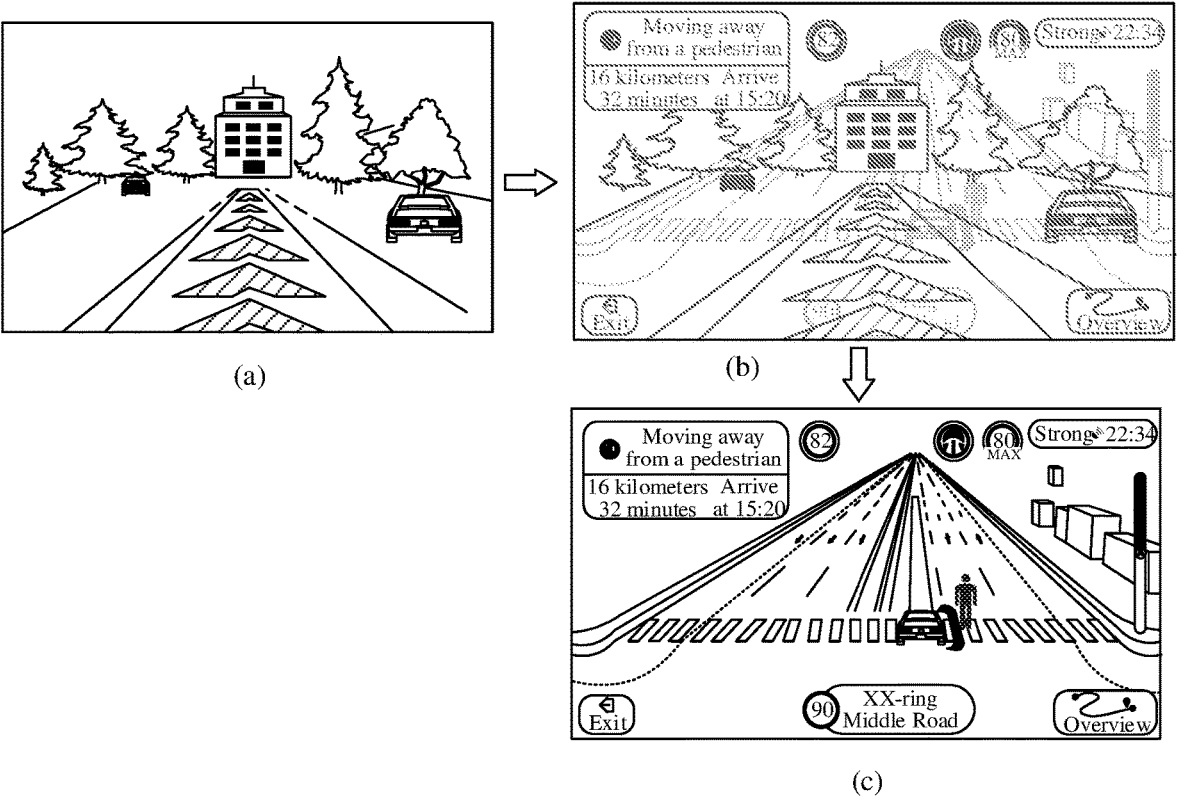
FIG. 11B is a schematic diagram showing switching from an AR base map to an HD base map according to some embodiments of this application.

In this embodiment, since the visibility of the first-type navigation map gradually decreases and the visibility of the second-type navigation map gradually increases with the playback of the first transition animation, an overlaying effect is generated in the animation, which achieves a seamless switching process, thereby improving change stability of a map breadth. FIG. 11A shows a process of switching from an SD base map to an AR base map. In FIG. 11A, (a) is an SD base map, (c) is an AR base map, and (b) shows an overlaying effect generated during the switching from the SD base map to the AR base map. FIG. 11B shows a process of switching from an AR base map to an HD base map. In FIG. 11B, (a) is an AR base map, (c) is an HD base map, and (b) shows an overlaying effect generated during the switching from the AR base map to the HD base map.

In some embodiments, the method further includes: returning, in response to the object moving out of the target road segment from inside of the target road segment and the object moving toward a next target road segment, the step of displaying the first-type navigation map on the navigation interface in a case that the object is located in the road range other than the target road segment of the road.

The next target road segment may be a road segment having the same preset road condition as the target road segment through which the object passed, or may be a road segment having a different preset road condition from the target road segment through which the object passed. For example, the target road segment through which the object passed is a road segment at a turning intersection, the next target road segment is a congested road segment, or the target road segment through which the object passed and the next target road segment are both road segments at turning intersections.

Specifically, the terminal returns to, in response to the object moving out of the target road segment from the inside of the target road segment and the object moving toward a next target road segment, the step of displaying the first-type navigation map on the navigation interface in a case that the object is located in the road range other than the target road segment of the road. Therefore, when the object is located in the road range other than the target road segment of the road, the terminal displays the first-type navigation map on the navigation interface. When the object is within the target road segment, the terminal displays the second-type navigation map on the navigation interface. In some embodiments, the terminal determines that the object moves toward the next target road segment in response to the object moving out of the target road segment from the inside of the target road segment and receiving data from the next target road segment. For example, in FIG. 9A and FIG. 9B, when the data about the next maneuver point is received after the object passes through a waypoint, that is, the maneuver point, the AR base map is closed, and a to-be-displayed navigation map is determined based on a distance between the object and the next target road segment.

In this embodiment, timely switching of the navigation map is achieved based on the target road segment on the road, which improves the navigation efficiency.

In some embodiments, the method further includes: performing, in response to the object moving out of the road segment from inside of the road segment and the object being at a first preset distance to the road segment, switching from the second-type navigation map on the navigation interface to the first-type navigation map.

The first preset distance is a predetermined distance, and may be, for example, 50 meters or 100 meters.

Specifically, the terminal performs switching from display of the second-type navigation map on the navigation interface by using the scale in the second scale range to display of the first-type navigation map on the navigation interface by using the scale in the first scale range in response to the object moving out of the target road segment from the inside of the target road segment and the object being at the first preset distance to the target road segment. Since the scale in the second scale range is greater than the scale in the first scale range, a mapsheet of the navigation map increases after the switching.

In some embodiments, the terminal performs switching from display of the second-type navigation map on the navigation interface by using the scale in the second scale range to display of the first-type navigation map on the navigation interface by using the scale in the first scale range in response to the object moving out of the target road segment from the inside of the target road segment, receiving no data about a next target road segment, and the object being at the first preset distance to the target road segment. In FIG. 9A and FIG. 9B, if new guidance data, for example, the data about the next maneuver point, is still not received after the object passes through a turning intersection and moves by m meters, the scale is adjusted, that is, the mapsheet is adjusted. For example, the first-type navigation map is displayed on the navigation interface and the mapsheet is increased.

In this embodiment, when the object is at the first preset distance to the target road segment, the first-type navigation map is displayed on the navigation interface, so that a navigation map with a larger mapsheet can be displayed, which facilitates direct observation of a position of the object, thereby facilitating determination of a next movement route.

In some embodiments, the displaying a first-type navigation map on the navigation interface in a case that a road segment of the road is in any preset road condition and the object is located in a road range other than the road segment of the road includes: displaying the first-type navigation map on the navigation interface in a case that the road segment of the road is in any preset road condition, the object is located in the road range other than the road segment of the road, and a distance between the object and the road segment is greater than or equal to a second preset distance.

The second preset distance may be determined based on a road type. A larger travelling velocity specified for a road indicates a larger second preset distance. For example, for a normal road, a small second preset distance is set, and for a highway or a city expressway, a large second preset distance is set.

A road display precision is a precision used during display of a road. A larger road display precision indicates more presented road details. The road display precision of the third-type navigation map is greater than a road display precision of the first-type navigation map, and the road degree-of-reality in the second-type navigation map is higher than the road degree-of-reality in the third-type navigation map. For example, the second-type navigation map is an AR map, and the third-type navigation map is an HD map.

Specifically, when the terminal supports the first-type navigation map, the second-type navigation map, and the third-type navigation map, during the switching between the first-type navigation map and the second-type navigation map, the third-type navigation map may be added as a transition, so that the switching from the first-type navigation map to the second-type navigation map is smoother. For example, during the switching between the first-type navigation map and the second-type navigation map, switching from the first-type navigation map to the third-type navigation map may be performed first, and then switching from the third-type navigation map to the second-type navigation map is performed.

In some embodiments, during the switching between the first-type navigation map and the second-type navigation map, the third-type navigation map may be added as a transition, so that the switching from the first-type navigation map to the second-type navigation map is smoother. In this case, the method further includes: displaying a third-type navigation map on the navigation interface in a case that the object is located in the road range other than the road segment of the road and the distance between the object and the road segment is less than the second preset distance. The road display precision of the third-type navigation map is greater than the road display precision of the first-type navigation map, and the road degree-of-reality in the second-type navigation map is higher than the road degree-of-reality in the third-type navigation map. In this embodiment, a visual effect of the navigation interface is improved, which facilitates understanding of the map on the navigation interface, thereby improving the navigation efficiency.

In some embodiments, the terminal displays the first-type navigation map on the navigation interface in a case that the object is located in the road range other than the target road segment of the road and the distance between the object and the target road segment is greater than or equal to the second preset distance. The terminal displays the third-type navigation map on the navigation interface and displays the second-type navigation map within the target road segment in a case that the object is located in the road range other than the target road segment of the road and the distance between the object and the target road segment is less than the second preset distance. For example, the second preset distance is a distance between a point D in FIG. 12A and a turning intersection, that is, a road segment AB. Before the object travels to the point D in FIG. 12A, the first-type navigation map is displayed on the navigation interface. On a road segment between the point D and a point A, the third-type navigation map is displayed on the navigation interface. On the turning intersection, that is, the road segment AB, the second-type navigation map is displayed on the navigation interface.

In some embodiments, the switching of the navigation map may be triggered when the object enters the target road segment. For example, the terminal performs switching from display of the third-type navigation map to display of the second-type navigation map in response to the object entering the target road segment. Certainly, the terminal can perform switching from display of the third-type navigation map to display of the second-type navigation map before the object enters the target road segment. For example, when the distance between the object and the target road segment is less than the second preset distance and greater than the third preset distance, the terminal can display the third-type navigation map. In response to the distance between the object and the target road segment decreasing to the third preset distance, the terminal performs switching from the third-type navigation map to the second-type navigation map. When the distance between the object and the target road segment decreases to the third preset distance, as the object moves toward the target road segment, the terminal maintains the display of the second-type navigation map, and performs switching of the navigation map type when the object moves from the target road segment or the object moves out of the target road segment by a specific distance.

In this embodiment, during the switching between the first-type navigation map and the second-type navigation map, the third-type navigation map may be added as a transition, so that the switching from the first-type navigation map to the second-type navigation map is smoother. In this way, the visual effect of the navigation interface is improved, which facilitates understanding of the map on the navigation interface, thereby improving the navigation efficiency.

In some embodiments, the displaying the third-type navigation map on the navigation interface includes: displaying the third-type navigation map on the navigation interface by using a scale in a third scale range, the scale in the second scale range being greater than the scale in the third scale range, and the scale in the third scale range being greater than the scale in the first scale range. Therefore, during the movement of the object into the target road segment from the outside of the target road segment, the scale of the navigation map gradually increases and the mapsheet gradually decreases, so that the navigation map is more consistent with an actual requirement, thereby improving the navigation efficiency.

In some embodiments, the displaying a third-type navigation map on the navigation interface in a case that the object is located in the road range other than the road segment of the road and the distance between the object and the road segment is less than the second preset distance includes: gradually reducing, in response to the object moving on the road toward the road segment, a mapsheet displayed on the third-type navigation map on the navigation interface by using gradually increasing scales within the third scale range in a case that the object is located in the road range other than the road segment of the road and the distance between the object and the road segment is less than the second preset distance.

The scale of the first-type navigation map belongs to the first scale range. A scale corresponding to a mapsheet of the third-type navigation map belongs to the third scale range, and the scale in the third scale range is greater than the scale in the first scale range. The scale of the second-type navigation map belongs to the second scale range, and the scale in the second scale range is greater than the scale in the first scale range. For example, the first scale range is a scale range composed of scales with levels of 4 to 19, the third scale range is a scale range composed of scales with levels of 20 to 21, and the second scale range is a scale range composed of scales with levels greater than or equal to a level of 22.

Specifically, when the object is located in the road range other than the target road segment of the road and the distance between the object and the target road segment is less than the second preset distance, the terminal gradually reduces the mapsheet of the third-type navigation map on the navigation interface, that is, gradually increases the scale of the third-type navigation map on the navigation interface in response to the object moving toward the target road segment on the road, and displays the second-type navigation map on the navigation interface by using the scale in the second scale range when determining that the object moves to the target road segment.

In this embodiment, in response to the object moving toward the road segment on the road, the mapsheet for displaying the third-type navigation map on the navigation interface is gradually reduced by using the gradually increasing scales within the third scale range. In this way, more details can be displayed, thereby improving the navigation efficiency.

In some embodiments, the displaying a second-type navigation map on the navigation interface in a case that the road segment is in the preset road condition and the object is located within the road segment includes: playing, on the navigation interface in response to the object moving into the road segment from outside of the road segment on the road and the road segment being in the preset road condition, a second transition animation presenting transition from the third-type navigation map to the second-type navigation map, a visibility of the third-type navigation map gradually decreasing and the visibility of the second-type navigation map gradually increasing with playback of the second transition animation; and displaying the second-type navigation map on the navigation interface after the second transition animation ends.

The second transition animation is configured to present a process of switching from the third-type navigation map to the second-type navigation map. With the playback of the second transition animation, the visibility of the third-type navigation map gradually decreases, and the visibility of the second-type navigation map gradually increases. For example, if the third-type navigation map is an HD map, and the second-type navigation map is an AR map, the second transition animation is configured to present a process of switching from the HD map to the AR map.

Specifically, the second transition animation may be obtained through fusion of an image of the third-type navigation map and the image of the second-type navigation map. For a specific process of generating the second transition animation, reference is made to the process of generating the first transition animation, which is not described herein.

In some embodiments, the step of displaying the third-type navigation map on the navigation interface in a case that the object is located in the road range other than the target road segment of the road and the distance between the object and the target road segment is less than the second preset distance includes: playing, during the movement of the object toward the target road segment, a third transition animation presenting transition from the first-type navigation map to the third-type navigation map on the navigation interface in response to the distance between the object and the target road segment being less than the second preset distance. With the playback of the third transition animation, the visibility of the first-type navigation map gradually decreases, and the visibility of the third-type navigation map gradually increases. The third transition animation is configured to present a process of switching from the first-type navigation map to the third-type navigation map. For example, if the first-type navigation map is an SD map, and the third-type navigation map is an HD map, the third transition animation is configured to present a process of switching from the SD map to the HD map. The third transition animation may be obtained through fusion of the image of the third-type navigation map and the image of the first-type navigation map. For a specific process of generating the third transition animation, reference is made to the process of generating the first transition animation, which is not described herein. Certainly, during the switching from the AR map to the HD map, an animation presenting the process of switching from the AR map to the HD map exists.

Figure 12B:
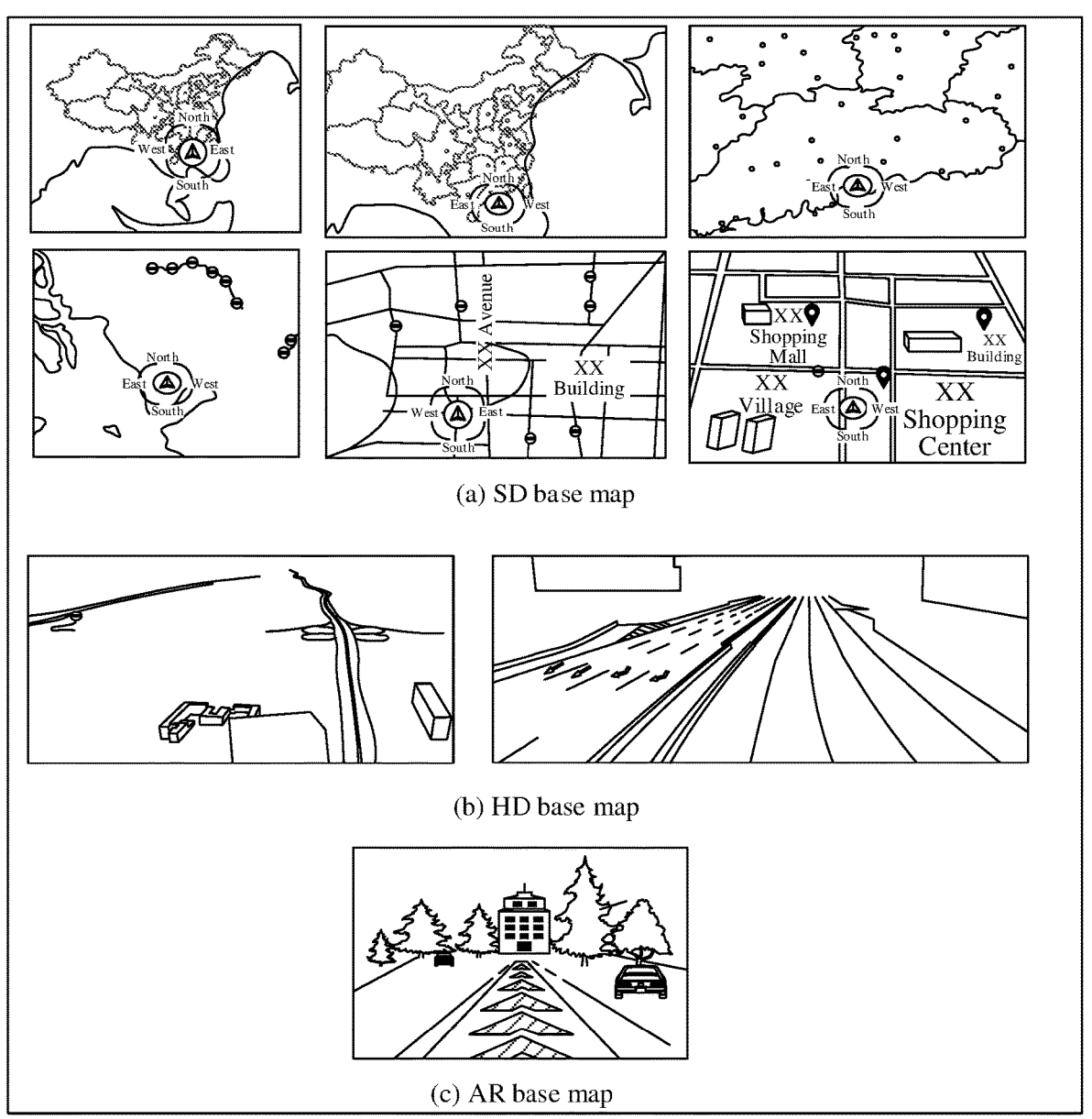
FIG. 12B is a schematic diagram showing navigation maps of different types according to some embodiments.

Table 2 shows a correspondence between a map type and a scale class. The scale class may also be referred to as a scale level. In this embodiment of this application, different scale ranges correspond to different navigation map types, which achieves uniform management of maps of different types through the scale. In this way, switching of the map type can be automatically triggered based on a change in the scale, thereby achieving automatic fusion (switching) of base maps in a plurality of modes by using the scale. The base maps in the plurality of modes include but are not limited to at least two of the SD base map, the HD base map, or the AR base map. FIG. 12B shows three types of base maps. From FIG. 12B, a policy for fusing SD and HD is easily learned. In an HD base map, non-road data still adopts SD map data, and a road segment having HD map data adopts an HD road style. Since an HD effect at a scale level less than a level of 20 has no clear advantages, only scale levels of 20, 21, and 22 are used as display grades of the HD base map. In other words, the HD map is displayed only at the scale grades of 20, 21, and 22, and the HD base map is invisible at other scale grades. Levels of 4 to 20 are specified as display grades of an SD base map, the level of 20 is used as a transition grade between SD and HD, and the level 22 is used as a transition grade between HD and AR. The scale level may also be referred to as a scale grade. A scale of each map in a transition animation (for example, the first transition animation, the second transition animation, and the third transition animation) may be a scale of the transition grade.

TABLE 2

| Fusion of base maps in a plurality of modes based on scale level | | |
|---|---|---|
| Scale class | Physical size (unit: meter) | Display mode |
| 4 | 2000,000 | SD |
| 5 | 1000,000 | |
| . . . | . . . | |
| 19 | 20 | |
| 20 | 10 | HD & SD |
| 21 | 5 | |
| 22 | 2 | HD & AR |
| 22+ | <2 | |

At scale levels of 4 to 19, an SD base map is displayed, at scale levels of 20 to 21, an HD base map is displayed, and at scale levels equal to or greater than 22, an AR base map is displayed. During switching from the SD base map to the HD base map, an overlaying effect exists between the HD base map and the SD base map, that is, the HD base map and the SD base map are simultaneously displayed. During switching from the HD base map to the AR base map, an overlaying effect exists between the HD base map and the AR base map, that is, the HD base map and the AR base map are simultaneously displayed. Table 2 shows scale levels represented by positive integers. Certainly, a scale level represented by a decimal also exists. For example, a plurality of scale levels may be obtained through interpolation in the scale levels represented by the positive integers. For example, 4.5 is obtained through interpolation between 4 and 5, and 1500,000 is obtained through interpolation between 2000,000 and 1000,000. In this case, 4.5 represents a scale level with a physical size of 1500,000 meters.

Figure 13:
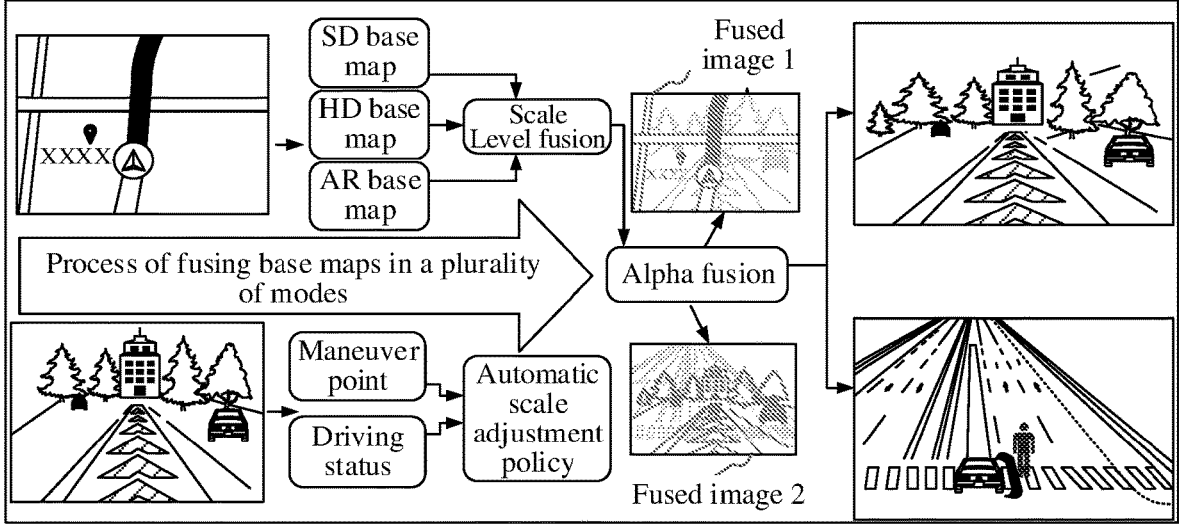
FIG. 13 is a diagram showing a principle of a map navigation method according to some embodiments.

FIG. 13 shows a flowchart showing fusing base maps in a plurality of modes according to some embodiments. During the fusion of the base maps in the plurality of modes, an optimal display grade and an optimal viewing angle are determined for each of the SD base map, the HD base map, and the AR based map based on an inherent characteristic thereof, and the respective display grades and viewing angles are integrated into a base map grade system, to form a complete base map grade system. Automatic switching between the base maps in the plurality of modes can be achieved by using a uniform automatic scale adjustment policy. FIG. 13 shows a process of fusing base maps in a plurality of modes. First, the base maps in the plurality of modes are integrated into a scale level management system in a scale level fusion manner. Then, a mapsheet is adjusted based on guidance information or autonomous driving status information. Finally, a scale and a pitch angle of a base map is switched based on a grade calculated by using the automatic scale adjustment policy. Switching between grades is implemented in the Alpha fusion manner to implement seamless transition. FIG. 13 shows a fused image 1 in an animation configured to present a process of switching from an SD map to an AR map and a fused image 2 in an animation configured to present a process of switching from the AR map to an HD map.

In this embodiment, since the visibility of the third-type navigation map gradually decreases and the visibility of the second-type navigation map gradually increases with the playback of the second transition animation, an overlaying effect in the animation, which achieves a seamless switching process, thereby improving change stability of a map breadth.

In some embodiments, the method further includes: displaying a navigation mode setting page, and displaying a first navigation mode option and a second navigation mode option on the navigation mode setting page; entering a first navigation mode and performing the operation of displaying the navigation interface in response to a triggering operation performed on the first navigation mode option; and entering a second navigation mode and performing split-screen display on the first-type navigation map and the second-type navigation map in response to a triggering operation performed on the second navigation mode option.

A navigation mode includes the first navigation mode and the second navigation mode. The first navigation mode option is configured to select the first navigation mode as a current navigation mode, and the second navigation mode option is configured to select the second navigation mode as the current navigation mode. In the first navigation mode, the navigation map on the navigation interface is displayed in a switchable manner. For example, switching from the first-type navigation map to the second-type navigation map is performed. In the second navigation mode, the navigation map on the navigation interface is displayed in a split-screen manner. For example, a navigation screen displaying the navigation interface is divided into two screen areas, the first-type navigation map is displayed in one of the screen areas, and the second-type navigation map is displayed in the other of the screen areas.

Figure 14A:
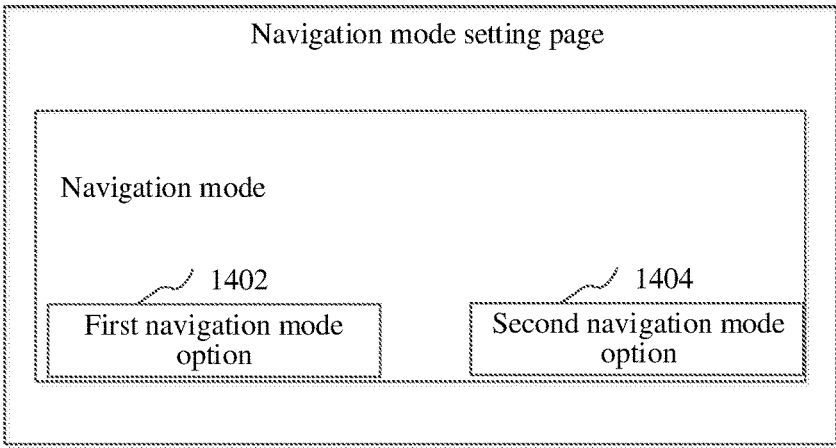
FIG. 14A is a schematic diagram showing a navigation mode according to some embodiments.

Specifically, the terminal can display the navigation mode setting page. The terminal can display the first navigation mode option and the second navigation mode option on the navigation mode setting page. When receiving a selection operation performed on the first navigation mode option, the terminal updates a status of the first navigation mode option to a selected state, and determines the first navigation mode as the current navigation mode of the object. As shown in FIG. 14A, a first navigation mode option 1402 and a second navigation mode option 1404 are displayed on the navigation mode setting page.

In some embodiments, in a case that the current navigation mode of the object is the first navigation mode, when the terminal determines that the object is located in the road range other than the target road segment of the road, the terminal displays the first-type navigation map on the navigation interface. When the terminal determines that the object is located within the target road segment, the terminal displays the second-type navigation map on the navigation interface.

In this embodiment, through display of the first navigation mode option and the second navigation mode option on the navigation mode setting page, the navigation mode can be flexibly selected, thereby improving navigation flexibility.

In some embodiments, the method further includes: displaying the second navigation mode option on a navigation interface in the first navigation mode; and entering a second navigation mode and performing split-screen display on the first-type navigation map and the second-type navigation map in response to a triggering operation performed on the second navigation mode option.

In the second navigation mode, the navigation map on the navigation interface is displayed in a split-screen manner. For example, a navigation screen displaying the navigation interface is divided into two screen areas, the first-type navigation map is displayed in one of the screen areas, and the second-type navigation map is displayed in the other of the screen areas. The triggering operation performed on the second navigation mode option is configured to trigger switching of the current navigation mode from the first navigation mode to the second navigation mode.

Figure 14B:
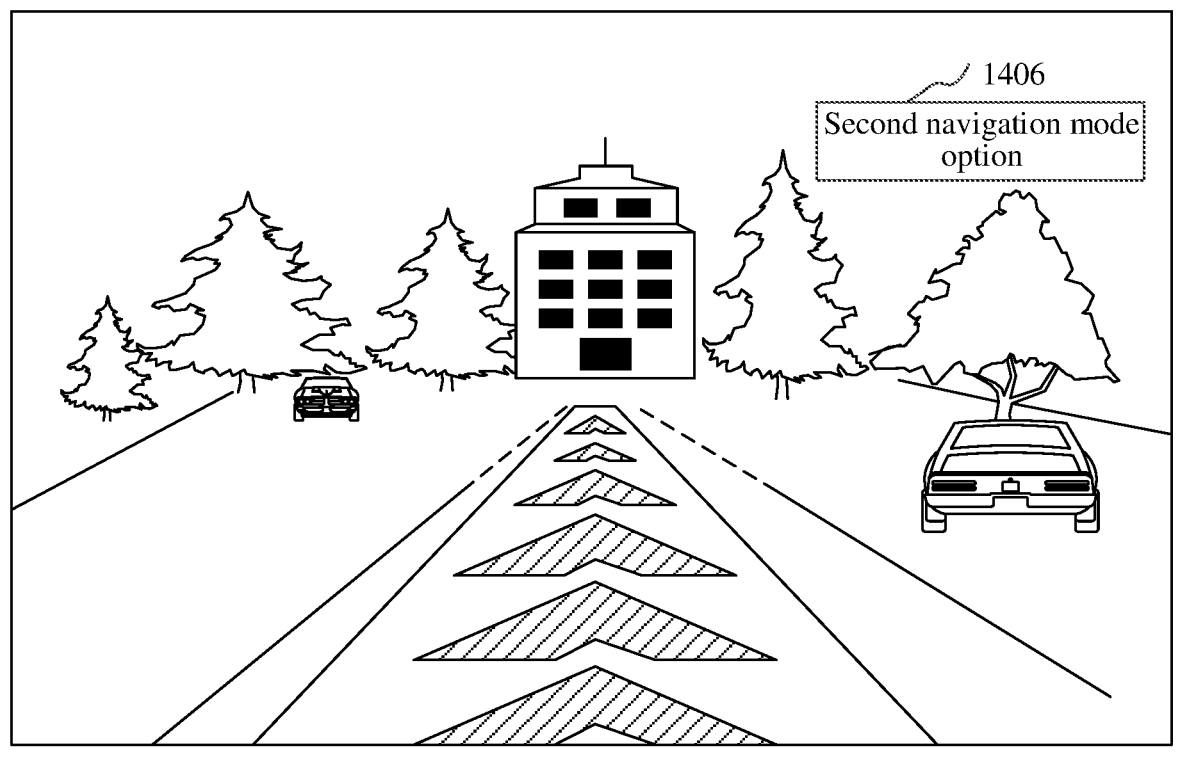
FIG. 14B is a schematic diagram showing displaying a second navigation mode according to some embodiments.

Specifically, when the current navigation mode of the object is the first navigation mode, the terminal can display the second navigation mode option of the first navigation mode while displaying the navigation map. As shown in FIG. 14B, the terminal displays a second navigation mode option 1406 of the first navigation mode while displaying an AR map. The terminal performs split-screen display on the first-type navigation map and the second-type navigation map on the navigation interface in response to the triggering operation performed on the second navigation mode option. For example, the terminal performs split-screen display on an SD map and an AR map on the navigation interface, or performs split-screen display on an HD map and an AR map on the navigation interface.

In some embodiments, when the current navigation mode of the object is the first navigation mode and the third-type navigation map is displayed on the navigation interface, the terminal performs split-screen display on the first-type navigation map and the third-type navigation map on the navigation interface in response to the triggering operation performed on the second navigation mode option. For example, when the object moves away from the target road segment, split-screen display may be performed on the first-type navigation map and the third-type navigation map on the navigation interface. Certainly, the terminal can perform split-screen display on the second-type navigation map and the third-type navigation map on the navigation interface. For example, when the object moves toward the target road segment, split-screen display may be performed on the second-type navigation map and the third-type navigation map on the navigation interface.

In this embodiment, a second navigation mode option of the second navigation mode is displayed on the navigation interface in the first navigation mode. In response to the triggering operation performed on the second navigation mode option, split-screen display is performed on the first-type navigation map and the second-type navigation map on the navigation interface. In this way, fast switching of the navigation mode can be achieved, thereby improving the navigation efficiency.

In some embodiments, the navigation interface is displayed on a navigation screen. The method further includes: determining a screen size of the navigation screen in response to the triggering operation performed on the second navigation mode option; and entering the first navigation mode and performing the operation of displaying the navigation interface in a case that the screen size is less than a preset screen size threshold.

The size of the navigation screen includes a length and a width of the navigation screen, with a unit of pixel. The preset screen size threshold is predetermined. When the size of the navigation screen reaches the preset screen size threshold, a split-screen display effect is relatively desirable.

Specifically, when the current navigation mode of the object is the first navigation mode, the terminal determines the size of the navigation screen in response to the triggering operation performed on the second navigation mode option. When the size of the navigation screen is greater than or equal to the preset screen size threshold, the terminal performs split-screen display on the first-type navigation map and the second-type navigation map on the navigation interface. In a case that the screen size is less than the preset screen size threshold, the terminal enters the first navigation mode, and the step of displaying the navigation interface is performed.

In some embodiments, when the size of the navigation screen is less than the preset screen size threshold, prompt information and the second navigation mode option of the second navigation mode are displayed. The prompt information is used for indicating that the navigation screen is not suitable for split-screen display. The terminal performs split-screen display on the first-type navigation map and the second-type navigation map on the navigation map on the navigation interface in response to a triggering operation performed on the second navigation mode option of the second navigation mode.

In this embodiment, when the size of the navigation screen is less than the preset screen size threshold, the terminal enters in the first navigation mode. Through switching of the navigation map, even if the size of the navigation screen is small, the navigation map on the small navigation screen is not excessively small, thereby ensuring navigation quality. When the size of the navigation screen is greater than or equal to the preset screen size threshold, split-screen display is performed on the first-type navigation map and the second-type navigation map on the navigation interface, so that the split-screen display effect can be improved, and a plurality of types of navigation maps can be displayed on a large navigation screen, thereby enriching navigation manners.

In some embodiments, the object is equipped with a navigation camera, and the displaying a second-type navigation map on the navigation interface in a case that the road segment is in the preset road condition and the object is located within the road segment includes: determining a pitch angle for viewing the road from a perspective of the object in a case that the road segment is in the preset road condition and the object is located within the road segment, the pitch angle matching a viewing angle of the navigation camera; and displaying a second-type navigation map having the pitch angle on the navigation interface.

The pitch angle for viewing the road from the perspective of the object may be referred to as a target pitch angle. The navigation camera is configured to collect data of the second-type navigation map. For example, the navigation camera can capture an image of a scene where the object is located, to obtain the data of the second-type navigation map. When the second-type navigation map is an AR map, the navigation camera is an AR camera. A picture presented on the second-type navigation map having the target pitch angle is a picture observed from the viewing angle of the navigation camera. The target pitch angle matching the viewing angle of the navigation camera means that the target pitch angle varies with the viewing angle of the navigation camera. The target pitch angle may be calculated based on the viewing angle of the navigation camera. When the object is a pedestrian, the AR camera may be worn on the pedestrian. When the object is a vehicle, the AR camera may be mounted to the vehicle.

Figure 15A:
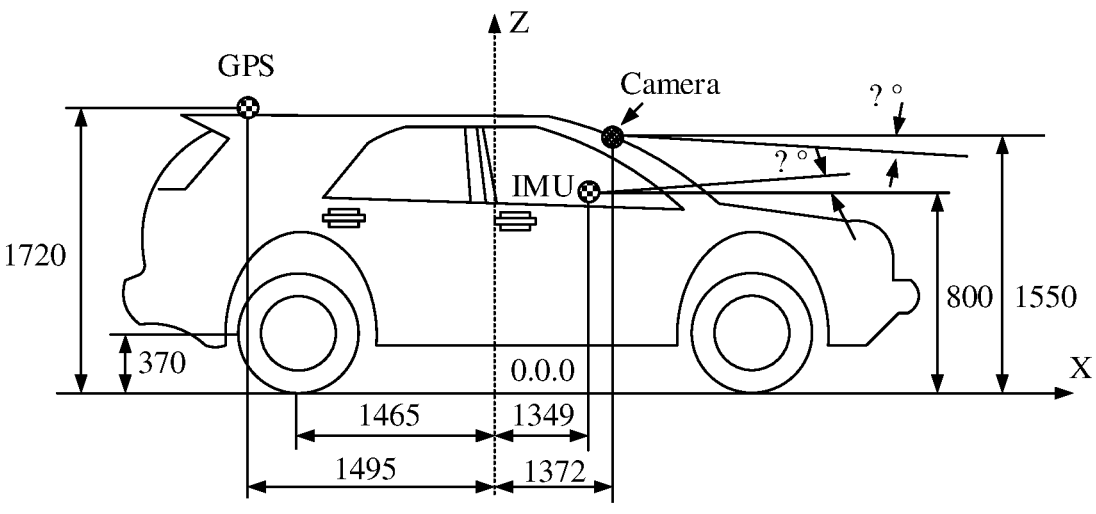
FIG. 15A is a schematic diagram showing mounting of a device of an AR system according to some embodiments.

An example in which the object is the vehicle is used. FIG. 15A is a schematic diagram showing mounting of a device of an AR system according to some embodiments. FIG. 15B is a top view of the mounting of the device of the AR system according to some embodiments. Theoretically, the camera needs to be horizontally mounted at a center. However, horizontal mounting cannot be implemented as a result of production process limitations. Therefore, a specific included angle is formed between the camera and a horizontal line. In this case, a camera mounting angle and a visible range need to be calculated from both a transverse dimension and a longitudinal dimension. As shown in FIG. 16, it is assumed that a point O is a position of a camera, O' is a foot of a perpendicular drawn from the point O to a horizontal ground, a height h of OO' is determined based on the mounting of the camera, $\alpha$ is a viewing angle of a lens of the camera, A represents a start point in a picture of the camera, a part O'A is invisible in the camera, OB is an angular bisector of the viewing angle of the camera, and O'OB is a mounting angle of the AR camera. The mounting angle O'OB corresponds to a magnitude of a pitch angle in an SD map. In other words, the mounting angle O'OB is a pitch angle of an AR map. A length AB cannot be easily measured, but a length O'A can be easily measured. The length h of O'O and the length $W_1$ of O'A can be measured. The angle $\alpha$ is provided by a camera lens supplier or may be measured. An SD-AR fusion solution is to calculate a mounting angle and a sensing range of an AR camera based on a physical attribute of the camera to determine a reference angle and a scale for multi-mode switching.

Specifically, the terminal can calculate the target pitch angle based on the viewing angle of the navigation camera, and display the second-type navigation map having the target pitch angle on the navigation interface. For example, the terminal can obtain a vertical distance from the navigation camera of the object to a ground surface, and calculate the target pitch angle based on the viewing angle of and the vertical distance from the navigation camera. The vertical distance is the above length h of O'O, and the viewing angle of the navigation camera is the above $\alpha$.

In this embodiment, the pitch angle for viewing the road from the perspective of the object is determined. The pitch angle matches the viewing angle of the navigation camera. The second-type navigation map having the pitch angle is displayed on the navigation interface, so that the picture presented on the second-type navigation map can accurately present the scene where the object is located, thereby improving reliability of the picture presented on the navigation map.

In some embodiments, the pitch angle is determined through a pitch angle determination operation. The pitch angle determination operation includes: obtaining a vertical distance from the navigation camera to a ground surface; and calculating the pitch angle based on the viewing angle of and the vertical distance from the navigation camera.

Specifically, the target pitch angle is the above pitch angle O'OB. The terminal can calculate the target pitch angle by using $W_1$, h, and $\alpha$. For example, the target pitch angle=arctan($W_1$/h)+$\alpha$/2.

In this embodiment, the target pitch angle is calculated based on the viewing angle of and the vertical distance from the navigation camera, thereby improving accuracy of the target pitch angle.

In some embodiments, the object is a vehicle, and the navigation interface is displayed through the navigation screen. The displaying a second-type navigation map on the navigation interface in a case that the road segment is in the preset road condition and the object is located within the road segment includes: determining a drivable area on the road for the vehicle and determining a map scale based on the drivable area and the screen size of the navigation screen in a case that the road segment is in the preset road condition and the object is located within the road segment; and displaying the second-type navigation map on the navigation interface by using the map scale.

The drivable area is an area in a scene in which the vehicle is located allowing the vehicle to travel. The map scale belongs to the second scale range. The map scale is correlated to the drivable area of the vehicle and the size of the navigation screen.

Figure 18:
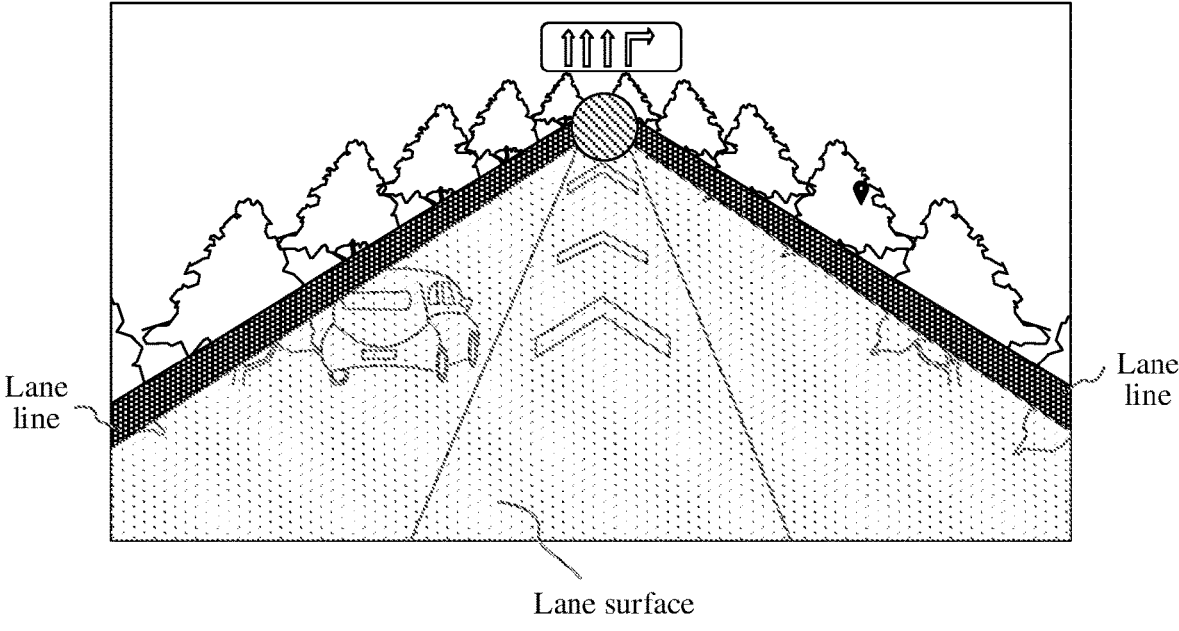
FIG. 18 is a schematic diagram showing an extracted drivable area according to some embodiments.
Figure 19:
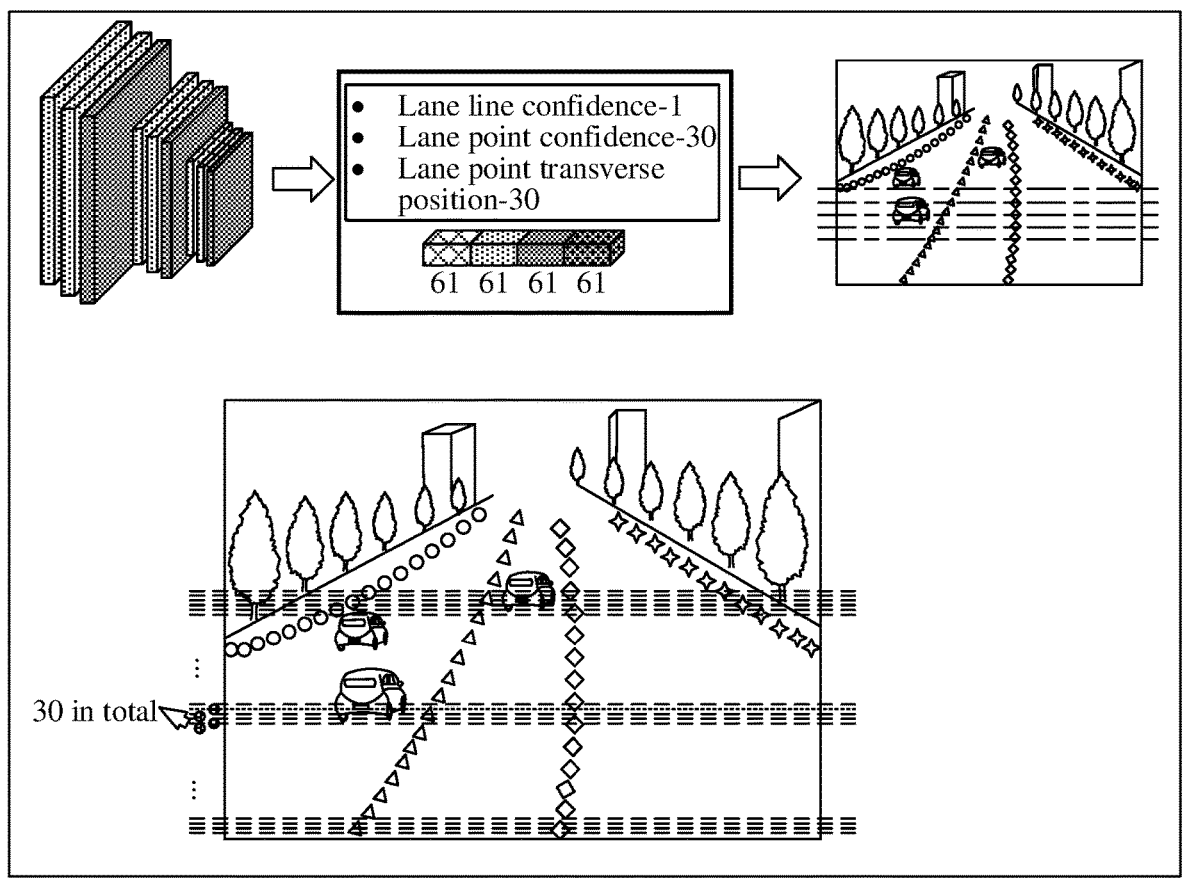
FIG. 19 is a diagram showing a principle of calculating a drivable area according to some embodiments.

Specifically, the terminal can determine the drivable area by extracting a lane line and a road surface. After a lane line of a road surface is identified, the road surface and a lane are determined based on the lane line. A current travelling road surface, that is, the drivable area, may be determined through a point of intersection between a lane line closure and an image edge. FIG. 17 is a flowchart showing extracting a lane line. A lane line extraction model is a neural network model with a lane line extraction function. The lane line extraction model may be a segmentation network by using a structural paradigm of "upsampling+downsampling." To achieve identification, a binary feature image having the same scale as an image inputted into the model is outputted, and pixels in the image belonging to a lane line and pixels belonging to a background are determined through the segmentation model. FIG. 18 shows an extracted road surface, that is, a drivable area. Certainly, the lane line extraction model may be a neural network that uses another structure, for example, may be a neural network that includes upsampling but does not include downsampling. A plurality of bisectrices are arranged in a height direction of a lower half part of a road image. A position of a lane line on each bisectrix is identified. A lane line polynomial equation is obtained through fitting of a plurality of position points. In addition, a lane line confidence is set to determine whether a lane line exists, and a lane line position point confidence is established to determine whether a lane line location point is a valid position point. After the downsampling, a vector with a length of 4×61 is outputted, which omits a computing power loss of the "upsampling" part, and improve performance of the model, as shown in FIG. 19. After the above drivable area and the lane are extracted, lanes included in a current AR map breadth may be calculated, so that a width of the drivable area can be calculated.

In this embodiment, since the map scale matches the drivable area of the vehicle and the size of the navigation screen, displaying the second-type navigation map on the navigation interface by using the map scale improves navigation accuracy.

In some embodiments, the determining a map scale based on the drivable area and the screen size of the navigation screen includes: obtaining a physical area width of the drivable area, and obtaining a screen width of the navigation screen; determine a physical size of a single pixel on the navigation screen based on the physical area width and the screen width; and determining the map scale based on the physical size.

The physical size is a geographical distance, that is, a real distance. The physical size corresponding to the single pixel is a real geographical distance covered by a pixel.

Figure 20:
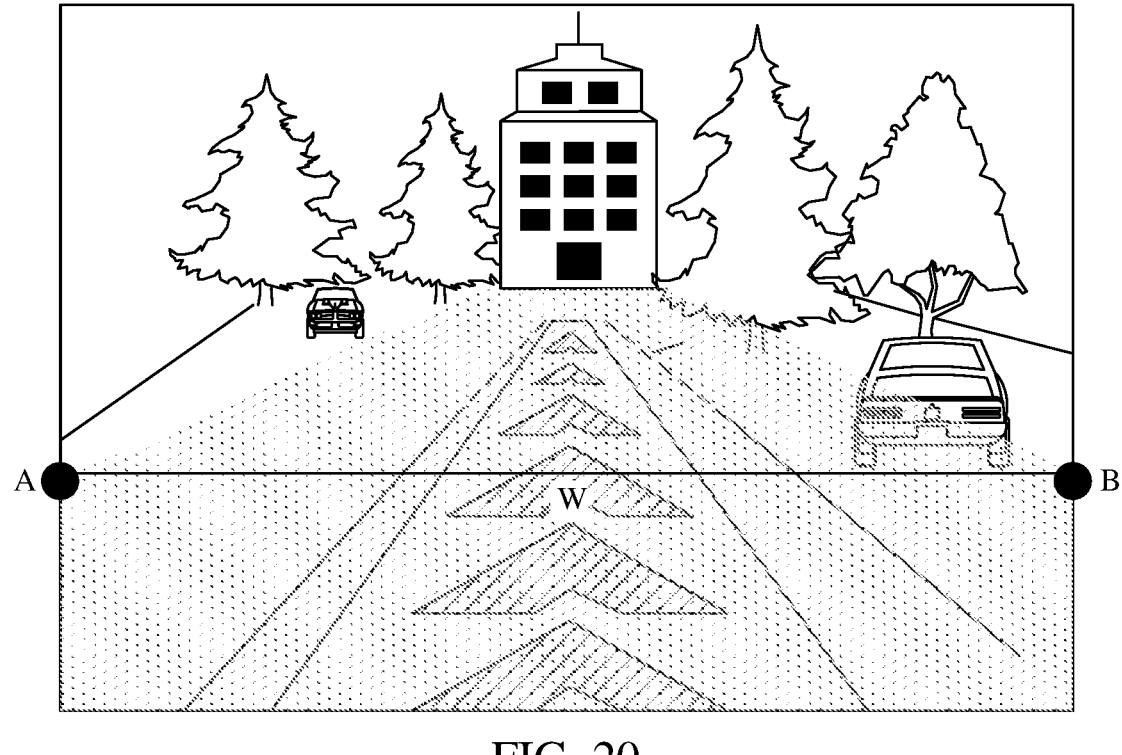
FIG. 20 is a diagram showing a principle of calculating a map scale according to some embodiments.

Specifically, different physical sizes correspond to different scales. The mapsheet in Table 1 may be understood as a physical size. It may be learned from Table 1 that different scale classes correspond to different physical sizes. Different scale classes indicate different scales, and different scales indicate different physical sizes. The terminal can determine a scale corresponding to the physical size corresponding to the single pixel based on a correspondence between a physical size and a scale, for example, the correspondence in Table 1, to obtain the map scale. An example in which the second-type navigation map is an AR map is used. In the AR map, a scale grade of the AR map may be calculated based on a visible range of a camera. The visible range may be determined through detection of a drivable area and measurement of a width of the drivable area. A correspondence between an AR class and an SD class may be calculated based on a real width and a scale level. As shown in FIG. 20, after the drivable area is obtained, a largest transverse distance AB within the drivable area may be calculated. W in FIG. 20 is a distance between A and B, and the distance between A and B can also be represented by AB. When an AR map breadth is displayed on a screen with a screen size of $W_{screen} \times H$, a physical size represented by each pixel on the screen is $d_{ar} = AB/W_{screen}$. On an SD base map, a physical size represented by each pixel corresponding to each scale grade is dn, n representing each scale grade, and a value range of n being 4 to 22. A scale grade corresponding to the AR map breadth may be determined through comparison $d_{ar}$ with dn, so as to determine the map scale.

In this embodiment, based on the physical area width of the drivable area of the vehicle and the screen width of the navigation screen, the physical size corresponding to the single pixel on the navigation screen is determined, and the map scale is determined based on the physical size, which improves accuracy of the map scale.

Figure 21:
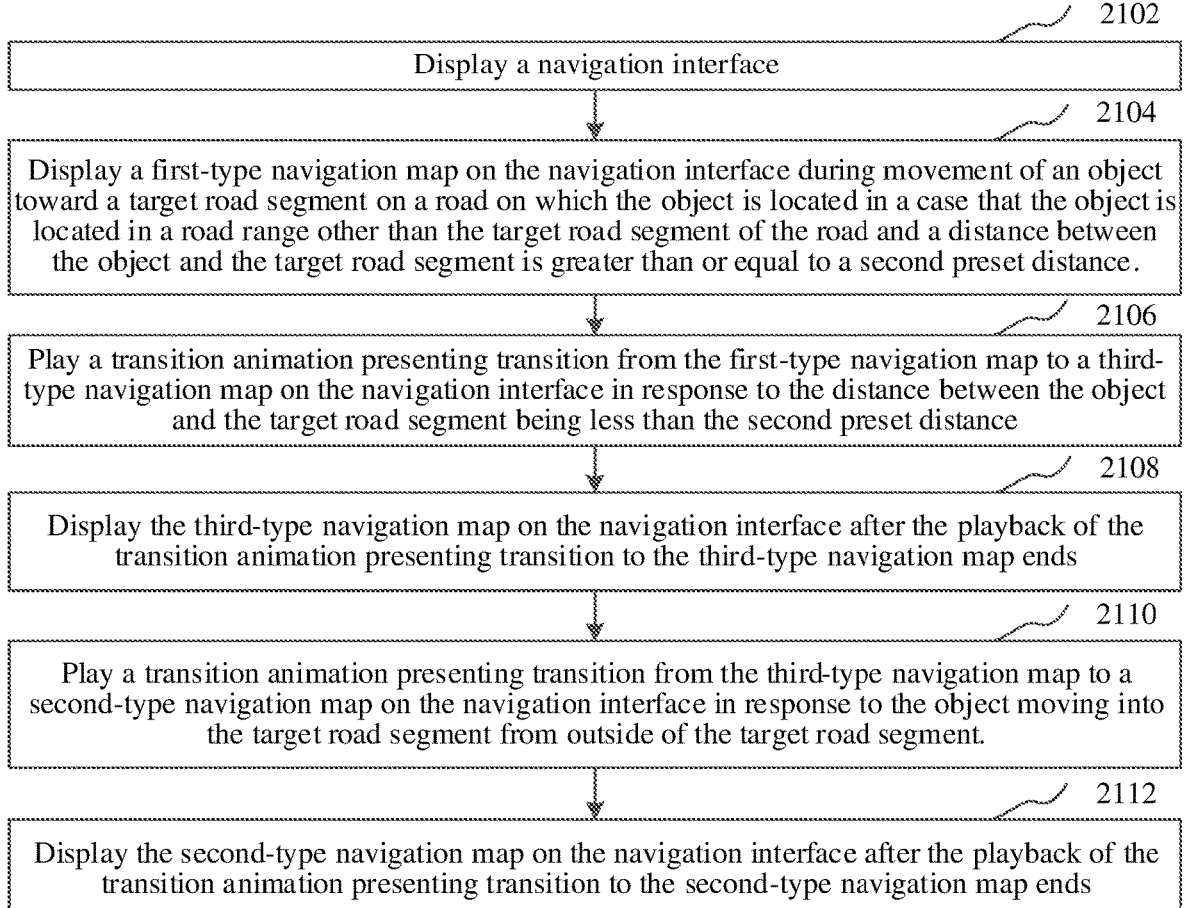
FIG. 21 is a schematic flowchart of a map navigation method according to some embodiments.

In some embodiments, as shown in FIG. 21, a map navigation method is provided. The method may be performed by a terminal, or may be perform jointly by the terminal and a server. A description is provided by using an example in which the method is applied to the terminal. The method includes the following steps:

Step 2102: Display a navigation interface.

The navigation interface is configured to perform road navigation for an object.

Step 2104: Display a first-type navigation map on the navigation interface during movement of the object toward a target road segment on a road on which the object is located in a case that the object is located in a road range other than the target road segment of the road and a distance between the object and the target road segment is greater than or equal to a second preset distance.

Step 2106: Play a transition animation presenting transition from the first-type navigation map to a third-type navigation map on the navigation interface in response to the distance between the object and the target road segment being less than the second preset distance.

With the playback of the transition animation presenting transition to the third-type navigation map, a visibility of the first-type navigation map gradually decreases, and a visibility of the third-type navigation map gradually increases. A scale of the first-type navigation map belongs to a first scale range. A scale corresponding to a mapsheet of the third-type navigation map belongs to a third scale range, and the scale in the third scale range is greater than the scale in the first scale range.

Step 2108: Display the third-type navigation map on the navigation interface after the playback of the transition animation presenting transition to the third-type navigation map ends.

Step 2110: Play a transition animation presenting transition from the third-type navigation map to a second-type navigation map on the navigation interface in response to the object moving into the target road segment from outside of the target road segment.

Step 2112: Display the second-type navigation map on the navigation interface after the playback of the transition animation presenting transition to the second-type navigation map ends.

In this embodiment, navigation maps of different types are displayed within different scale ranges, which achieves fusion of a plurality of navigation maps the scale, so that a navigation map and a scale can be automatically switched to a navigation map and a scale better matching a scene, thereby improving navigation efficiency.

The map navigation method provided in this application may be applied to a pedestrian, a vehicle driving scenario, and a manned driving scenario. An example in which the first-type navigation map is an SD map, the second-type navigation map is an AR map, the third-type navigation map is an HD map, and the target road segment is a turning intersection is used. For a target vehicle in the vehicle driving scenario, the navigation interface is displayed during movement of the target vehicle on a road. During movement of the target road toward a turning intersection on the road on which the target vehicle is located, when the target vehicle is located in a road range other than the turning intersection of the road and a distance between the target vehicle and the turning intersection is greater than or equal to the second preset distance, the SD map is displayed on the navigation interface. In response to the distance between the target vehicle and the turning intersection being less than the second preset distance, a transition animation presenting transition from the SD map to the HD map is played on the navigation interface. After the playback of the transition animation presenting transition to the HD map ends, the HD map is displayed on the navigation interface. In response to the target vehicle moving into the turning intersection from outside of the turning intersection, a transition animation presenting transition from the HD map to the AR map is played on the navigation interface. After the playback of the transition animation presenting transition to the AR map ends, the AR map is displayed on the navigation interface. With the playback of the transition animation presenting transition to the HD map, a visibility of the SD map gradually decreases, and a visibility of the HD map gradually increases. A scale of the SD map belongs to the first scale range. A scale corresponding to a mapsheet of the HD map belongs to the third scale range, and the scale in the third scale range is greater than the scale in the first scale range. A scale of the AR map belongs to a second scale range, and the scale in the second scale range is greater than the scale in the third scale range.

It is to be understood that, although the steps in the flowcharts in the embodiments described above are successively displayed according to the instructions of the arrows, these steps are not necessarily successively performed according to the sequence instructed by the arrows. Unless otherwise explicitly specified in this application, execution of the steps is not strictly limited, and the steps may be performed in another sequence. Moreover, at least some of the steps in the embodiments described above may include a plurality of steps or a plurality of stages. The steps or stages are not necessarily performed at the same moment but may be performed at different moments. These steps or stages are not necessarily successively performed, but may be performed alternately with other steps or at least some of steps or stages of other steps.

An embodiment of this application further provides a map navigation apparatus configured to implement the above map navigation method. An implementation provided by the apparatus for resolving the problem is similar to the implementation described in the above method. Therefore, for specific limitations in one or more map navigation apparatus embodiments provided below, reference is made to the limitations of the above map navigation method. The details are not described herein.

Figure 22:
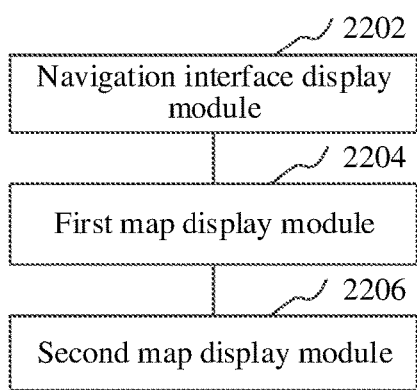
FIG. 22 is a structural block diagram of a map navigation apparatus according to some embodiments.

In some embodiments, as shown in FIG. 22, a map navigation apparatus is provided, including a navigation interface display module 2202, a first map display module 2204, and a second map display module 2206.

The navigation interface display module 2202 is configured to display a navigation interface, the navigation interface being configured to navigate an object moving on a road.

The first map display module 2204 is configured to display a first-type navigation map on the navigation interface in a case that a road segment of the road is in any preset road condition and the object is located in a road range other than the road segment of the road.

The second map display module 2206 is configured to display a second-type navigation map on the navigation interface in a case that the road segment is in the preset road condition and the object is located within the road segment, a scale used in the second-type navigation map being greater than a scale used in the first-type navigation map.

In some embodiments, a road degree-of-reality in the second-type navigation map is higher than a road degree-of-reality in the first-type navigation map.

In some embodiments, the first map display module 2204 is further configured to display the first-type navigation map by using a scale in a first scale range. The second map display module 2206 is further configured to display the second-type navigation map by using a scale in a second scale range. The scale in the second scale range is greater than the scale in the first scale range.

In some embodiments, the first map display module 2204 is further configured to reduce, in response to the object moving on the road toward the road segment, a mapsheet displayed on the first-type navigation map on the navigation interface by using gradually increasing scales within the first scale range in a case that the road segment of the road is in any preset road condition and the object is located in the road range other than the road segment of the road.

In some embodiments, the second map display module 2206 is further configured to perform switching from the scale in the first scale range to the scale in the second scale range and perform switching from the first-type navigation map displayed on the navigation interface to the second-type navigation map in response to the object moving into the road segment from outside of the road segment on the road.

In some embodiments, the second map display module 2206 is further configured to: play, on the navigation interface, a first transition animation showing transition from the first-type navigation map to the second-type navigation map in response to the object moving into the road segment on the road from outside of the road segment, a visibility of the first-type navigation map gradually decreasing and a visibility of the second-type navigation map gradually increasing with playback of the first transition animation; and perform switching from the scale in the first scale range to the scale in the second scale range and display the second-type navigation map on the navigation interface after the first transition animation ends.

In some embodiments, the apparatus is further configured to perform, in response to the object moving out of the road segment from inside of the road segment and the object being at a first preset distance to the road segment, switching from the second-type navigation map on the navigation interface to the first-type navigation map.

In some embodiments, the first map display module 2204 is further configured to display the first-type navigation map on the navigation interface in a case that the road segment of the road is in any preset road condition, the object is located in the road range other than the road segment of the road, and a distance between the object and the road segment is greater than or equal to a second preset distance.

In some embodiments, the apparatus further includes a third map display module. The third map display module is configured to display a third-type navigation map on the navigation interface in a case that the object is located in the road range other than the road segment of the road and the distance between the object and the road segment is less than the second preset distance, a road display precision in the third-type navigation map being greater than a road display precision in the first-type navigation map, and the road degree-of-reality in the second-type navigation map being higher than a road degree-of-reality in the third-type navigation map.

In some embodiments, the third map display module is further configured to display the third-type navigation map on the navigation interface by using a scale in a third scale range, the scale in the second scale range being greater than the scale in the third scale range, and the scale in the third scale range being greater than the scale in the first scale range.

In some embodiments, the third map display module is further configured to gradually reduce, in response to the object moving on the road toward the road segment, a mapsheet displayed on the third-type navigation map on the navigation interface by using gradually increasing scales within the third scale range in a case that the object is located in the road range other than the road segment of the road and the distance between the object and the road segment is less than the second preset distance. In some embodiments, the second map display module 2206 is further configured to: play, on the navigation interface in response to the object moving into the road segment from outside of the road segment on the road and the road segment being in the preset road condition, a second transition animation presenting transition from the third-type navigation map to the second-type navigation map, a visibility of the third-type navigation map gradually decreasing and the visibility of the second-type navigation map gradually increasing with playback of the second transition animation; and display the second-type navigation map on the navigation interface after the second transition animation ends.

In some embodiments, the apparatus is further configured to: display a navigation mode setting page, and display a first navigation mode option and a second navigation mode option on the navigation mode setting page; enter a first navigation mode and perform the operation of displaying the navigation interface in response to a triggering operation performed on the first navigation mode option; enter a second navigation mode and perform split-screen display on the first-type navigation map and the second-type navigation map in response to a triggering operation performed on the second navigation mode option.

In some embodiments, the apparatus is further configured to: display the second navigation mode option on a navigation interface in the first navigation mode; and enter a second navigation mode and perform split-screen display on the first-type navigation map and the second-type navigation map in response to the triggering operation performed on the second navigation mode option.

In some embodiments, the navigation interface is displayed on a navigation screen. The apparatus is further configured to: determine a screen size of the navigation screen in response to the triggering operation performed on the second navigation mode option; and enter the first navigation mode and perform the operation of displaying the navigation interface in a case that the screen size is less than a preset screen size threshold.

In some embodiments, the object is equipped with a navigation camera. The second map display module 2206 is further configured to: determine a pitch angle for viewing the road from a perspective of the object in a case that the road segment is in the preset road condition and the object is located within the road segment, the pitch angle matching a viewing angle of the navigation camera; and display a second-type navigation map having the pitch angle on the navigation interface.

In some embodiments, the apparatus further includes a pitch angle determination module. The pitch angle determination module is configured to: a vertical distance from the navigation camera to a ground surface; and calculate the pitch angle based on the viewing angle of and the vertical distance from the navigation camera.

In some embodiments, the object is a vehicle, and the navigation interface is displayed through the navigation screen. The second map display module 2206 is further configured to: determine a drivable area on the road for the vehicle and determine a map scale based on the drivable area and the screen size of the navigation screen in a case that the road segment is in the preset road condition and the object is located within the road segment; display the second-type navigation map on the navigation interface by using the map scale.

In some embodiments, the apparatus further includes a scale determination module. The scale determination module is configured to obtain a physical area width of the drivable area, and obtain a screen width of the navigation screen; determine a physical size of a single pixel on the navigation screen based on the physical area width and the screen width; and determine the map scale based on the physical size.

All or some of modules in the map navigation apparatus may be implemented by software, hardware, or a combination thereof. The above modules may be built in or independent of a processor of a computer device in a form of hardware, or may be stored in a memory of the computer device in a form of software, so that the processor invokes each of the above modules to perform an operation corresponding to the module.

In some embodiments, a computer device is provided. The computer device may be a server. An internal structural diagram of the computer device may be shown in FIG. 23. The computer device includes a processor, a memory, an input/output (I/O for short) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a nonvolatile storage medium and an internal memory. The nonvolatile storage medium has an operating system, computer-readable instructions, and a database stored therein. The internal memory provides an environment for running of the operating system and the computer-readable instructions in the nonvolatile storage medium. The database of the computer device is configured to store data involved in a map navigation method. The I/O interface of the computer device is configured to perform information exchange between the processor and an external device. The communication interface of the computer device is configured to connect to and communicate with an external terminal through a network. The computer-readable instructions, when executed, by the processor, implement the map navigation method.

In some embodiments, a computer device is provided. The computer device may be a terminal. An internal structural diagram of the computer device may be shown in FIG. 24. The computer device includes a processor, a storage, an I/O interface, a communication interface, a display unit, and an input apparatus. The processor, the storage, and the I/O interface are connected through a system bus. The communication interface, the display unit, and the input apparatus are connected to the system bus through the I/O interface. The processor of the computer device is configured to provide computing and control capabilities. The storage of the computer device includes a nonvolatile storage medium and an internal memory. The nonvolatile storage medium has an operating system and computer-readable instructions stored therein. The internal memory provides an environment for running of the operating system and the computer-readable instructions in the nonvolatile storage medium. The I/O interface of the computer device is configured to perform information exchange between the processor and an external device. The communication interface of the computer device is configured to perform wired or wireless communication with an external terminal. The wireless communication may be implemented through Wi-Fi, a mobile cellular network, near field communication (NFC), or another technology. The computer-readable instructions, when executed by the processor, implement a map navigation method. The display unit of the computer device is configured to form a visually visible picture, and may be a display screen, a projection apparatus, or a virtual reality imaging apparatus. The display screen may be a liquid crystal display screen or an electronic ink display screen. The input apparatus of the computer device may be a touch layer covering the display screen, or may be a button, a trackball, or a touchpad disposed on a housing of the computer device, or may be an external keyboard, touchpad, mouse, or the like.

Figure 23:
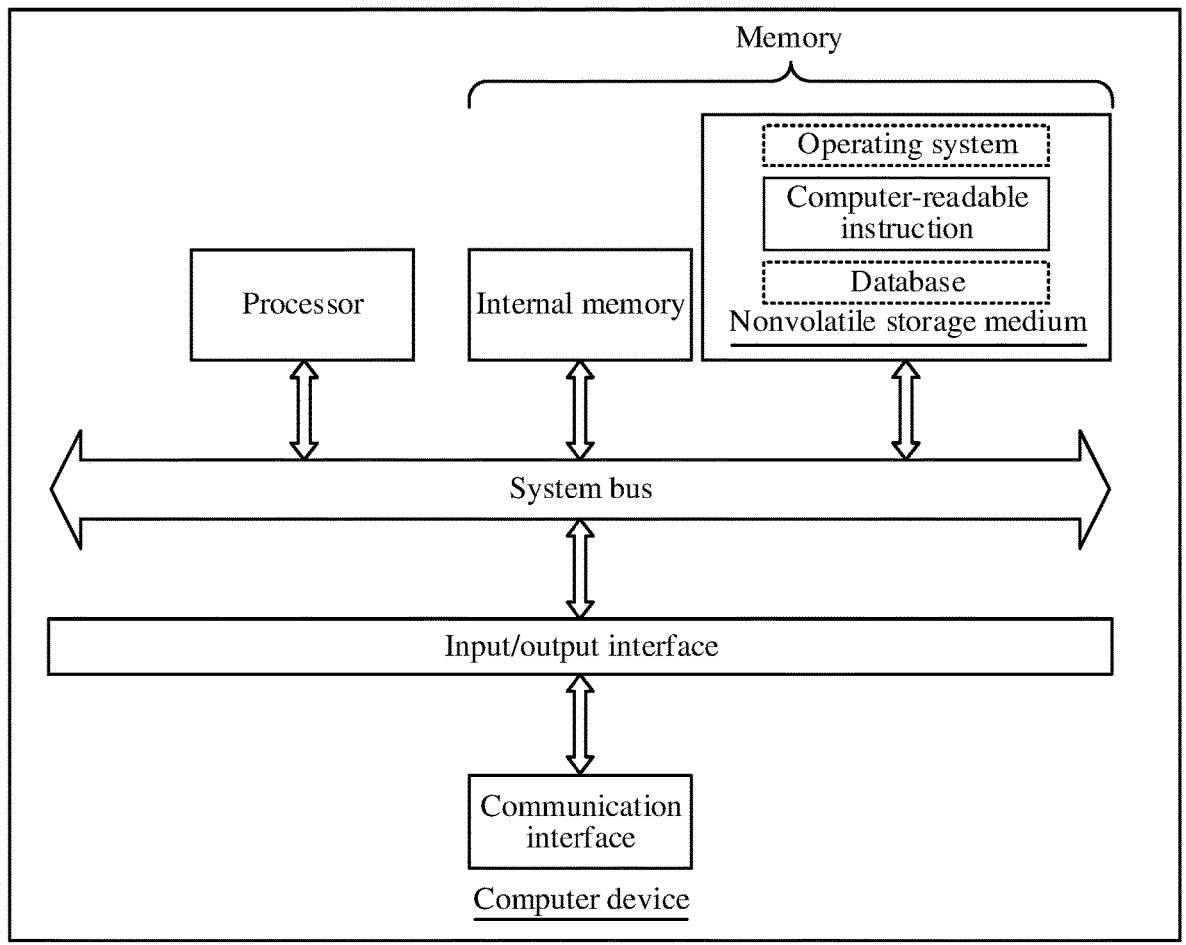
FIG. 23 is a diagram showing an internal structure of a computer device according to some embodiments.
Figure 24:
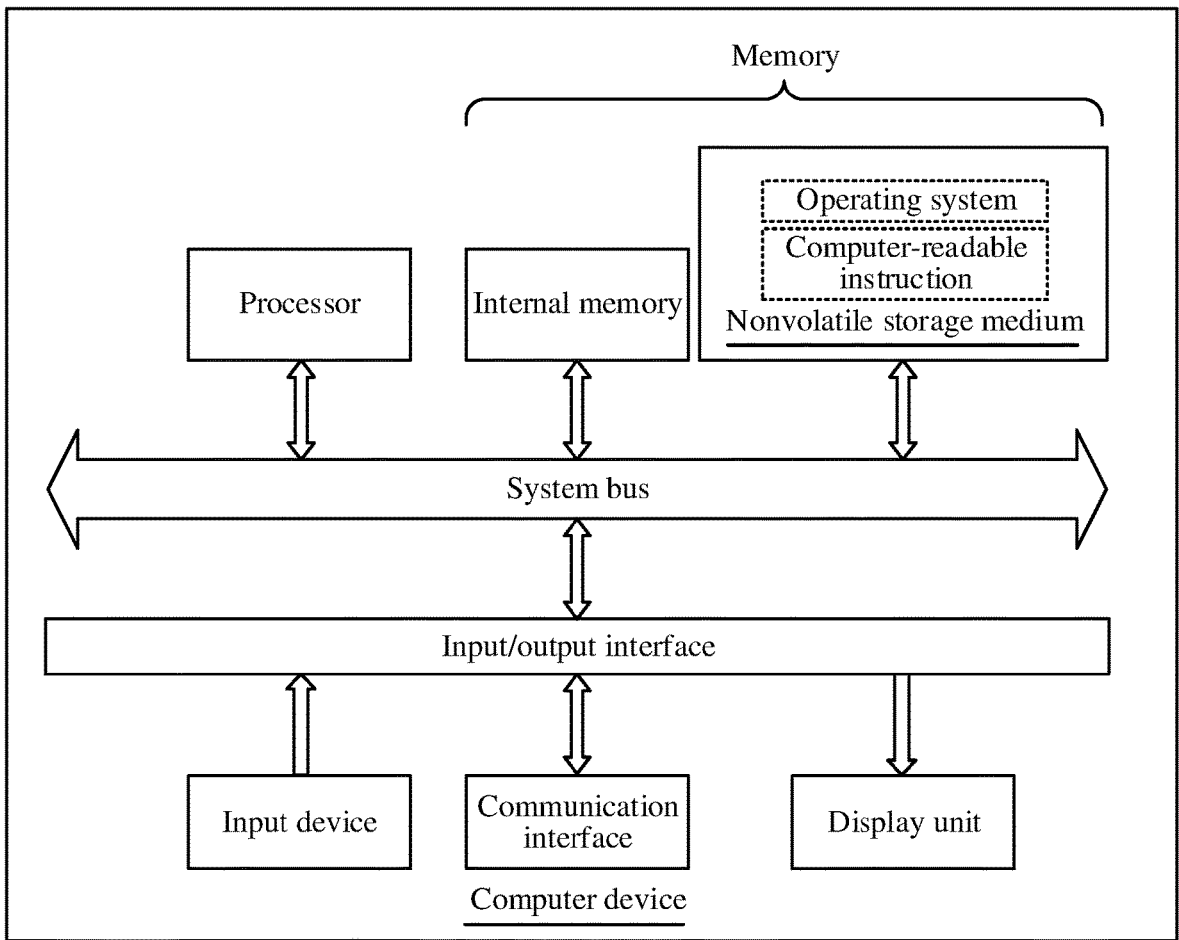
FIG. 24 is a diagram showing an internal structure of a computer device according to some embodiments.

A person skilled in the art may understand that, the structures shown in FIG. 23 and FIG. 24 are merely block diagrams showing partial structures related to the solutions of this application, and do not constitute a limitation to the computer device to which the solutions of this application are applied. Specifically, the computer device may include more components or fewer components than those shown in the figure, or some merged components, or different component arrangements.

In some embodiments, a computer device is provided, including a memory and one or more processors, the memory having computer-readable instructions stored therein, and the processor, when executing the computer-readable instructions, implementing the steps of the above map navigation method.

In some embodiments, one or more computer-readable storage media are provided, having computer-readable instructions stored therein, the computer-readable instructions, when executed by a processor, implementing the steps of the above map navigation method.

In some embodiments, a computer program product is provided, including computer-readable instructions, the computer-readable instructions, when executed by one or more processors, implementing the steps of the above map navigation method.

The user information (including but not limited to user device information and user personal information) and data (including but not limited to data for analysis, stored data, and displayed data) in this application are all information and data authorized by the user or fully authorized by all parties, and collection, use, and processing of relevant data need to comply with relevant laws, regulations, and standards of relevant countries and regions.

A person of ordinary skill in the art may understand that all or some processes of the methods in the above embodiments may be implemented by computer-readable instructions by instructing relevant hardware. The computer-readable instructions may be stored in a nonvolatile computer-readable storage medium. When the computer-readable instructions are executed, the processes of the above method embodiments can be implemented. Any reference to a memory, a database, or another medium used in the embodiments provided in this application may include at least one of a nonvolatile memory or a volatile memory. The nonvolatile memory may include a read-only memory (ROM), a magnetic tape, a floppy disk, a flash memory, an optical memory, a high density embedded nonvolatile memory, a resistive random access memory (ReRAM), a magnetoresistive random access memory (MRAM), a ferroelectric random access memory (FRAM), a phase change memory (PCM), a graphene memory, and the like. The volatile memory may include a RAM, an external cache memory, or the like. By way of description and not limitation, the RAM may be in various forms, such as a static random access memory (SRAM) or a dynamic random access memory (DRAM). The databases involved in the embodiments provided in this application may include at least one of a relational database or a non-relational database. The non-relational database may include a block-chain-based distributed database, but is not limited thereto. The processor involved in the embodiments provided in this application may be a general-purpose processor, a central processing unit, a graphics processing unit, a digital signal processor, a programmable logic device, a data processing logic device based on quantum computing, or the like, but is not limited thereto.

The technical features of the above embodiments may be randomly combined. To make the description concise, not all possible combinations of the technical features in the above embodiments are described. However, the combinations of these technical features are considered to fall within the scope recorded in this specification provided that no conflict exists.

The above embodiments are only some implementations of this application and are described in detail, which, however, are not to be construed as a limitation on the patent scope of this application. It is to be understood that, a person of ordinary skill in the art may make transformations and improvements without departing from the concept of this application. These transformations and improvements fall within the protection scope of this application. Therefore, the protection scope of this application is subject to the appended claims.

What is claimed is:

1. A map navigation method, performed by a computer device, comprising:

displaying a navigation interface;

displaying a first-type navigation map on the navigation interface in response to a target road segment of a road being in a preset road condition and an object being located in a road range other than the target road segment, the first-type navigation map comprising an electronic map that is not generated from real scene images; and displaying a second-type navigation map on the navigation interface in response to the target road segment being in the preset road condition and the object being located within the target road segment, a scale used in the second-type navigation map being greater than a scale used in the first-type navigation map, the second-type navigation map comprising a real scene navigation map in a form of an augmented reality (AR) map generated from images captured in real time by a navigation camera mounted to the object, wherein the second-type navigation map is displayed at a pitch angle for viewing the road from a perspective of the object, the pitch angle matches a viewing angle of the navigation camera, and wherein the displaying the second-type navigation map on the navigation interface includes: determining a drivable area on the road for the object; determining a map scale based on the drivable area and a display size of the navigation interface; and displaying the second-type navigation map on the navigation interface by using the map scale.

2. The method according to claim 1, wherein a road degree-of-reality in the second-type navigation map is higher than a road degree-of-reality in the first-type navigation map.

3. The method according to claim 1, wherein the first-type navigation map is displayed by using a scale in a first scale range, and the second-type navigation map is displayed by using a scale in a second scale range, the scale in the second scale range being greater than the scale in the first scale range.

4. The method according to claim 3, wherein displaying the first-type navigation map on the navigation interface includes:

gradually reducing, in response to the object moving on the road toward the target road segment, a mapsheet displayed on the first-type navigation map on the navigation interface by gradually increasing the scale within the first scale range used to display the first-type navigation map.

5. The method according to claim 3, wherein displaying the second-type navigation map on the navigation interface includes, in response to the object moving from outside of the target road segment into the target road segment:

switching from the scale in the first scale range to the scale in the second scale range and switching from displaying the first-type navigation map on the navigation interface to displaying the second-type navigation map on the navigation interface.

6. The method according to claim 5, wherein switching from the scale in the first scale range to the scale in the second scale range and switching from displaying the first-type navigation map on the navigation interface to displaying the second-type navigation map on the navigation interface includes:

playing, on the navigation interface, a transition animation, including gradually decreasing a visibility of the first-type navigation map and gradually increasing a visibility of the second-type navigation map gradually; and after the transition animation ends, switching from the scale in the first scale range to the scale in the second scale range and displaying the second-type navigation map on the navigation interface.

7. The method according to claim 5, further comprising:

in response to the object moving out of the target road segment from inside of the target road segment and the object being at a preset distance to the road segment, switching from displaying the second-type navigation map on the navigation interface to displaying the first-type navigation map on the navigation interface.

8. The method according to claim 1, wherein displaying the first-type navigation map on the navigation interface includes:

displaying the first-type navigation map on the navigation interface in response to a distance between the object and the target road segment being greater than or equal to a preset distance.

9. The method according to claim 8, further comprising:

displaying a third-type navigation map on the navigation interface in response to the object being located in the road range other than the target road segment and the distance between the object and the target road segment being less than the preset distance;

wherein a road display precision in the third-type navigation map is greater than a road display precision in the first-type navigation map, and a road degree-of-reality in the second-type navigation map is higher than a road degree-of-reality in the third-type navigation map.

10. The method according to claim 9, wherein:

displaying the first-type navigation map on the navigation interface includes displaying the first-type navigation map on the navigation interface by using a scale in a first scale range;

displaying the second-type navigation map on the navigation interface includes displaying the second-type navigation map on the navigation interface by using a scale in a second scale range;

displaying the third-type navigation map on the navigation interface includes displaying the third-type navigation map on the navigation interface by using a scale in a third scale range; and the scale in the second scale range is greater than the scale in the third scale range, and the scale in the third scale range is greater than the scale in the first scale range.

11. The method according to claim 10, wherein displaying the third-type navigation map on the navigation interface includes:

gradually reducing, in response to the object moving on the road toward the target road segment, a mapsheet displayed on the third-type navigation map on the navigation interface by gradually increasing the scale within the third scale range.

12. The method according to claim 11, wherein displaying the second-type navigation map on the navigation interface includes:

playing, on the navigation interface in response to the object moving from outside of the target road segment into the target road segment, a transition animation, including gradually decreasing a visibility of the third-type navigation map and gradually increasing a visibility of the second-type navigation map; and displaying the second-type navigation map on the navigation interface after the transition animation ends.

13. The method according to claim 1, further comprising:

displaying a navigation mode setting page, and displaying a first navigation mode option and a second navigation mode option on the navigation mode setting page;

entering a first navigation mode and displaying the navigation interface in response to a triggering operation performed on the first navigation mode option; and entering a second navigation mode and displaying the first-type navigation map and the second-type navigation map in split screens, in response to a triggering operation performed on the second navigation mode option.

14. The method according to claim 13, further comprising:

displaying the second navigation mode option on the navigation interface in the first navigation mode; and entering the second navigation mode and displaying the first-type navigation map and the second-type navigation map in split screens, in response to the triggering operation performed on the second navigation mode option.

15. The method according to claim 13, further comprising:

determining a screen size of a navigation screen for displaying the navigation interface, in response to the triggering operation performed on the second navigation mode option; and entering the first navigation mode and displaying the navigation interface in response to the screen size being less than a preset screen size threshold.

16. The method according to claim 1, further comprising:

obtaining a vertical distance from the navigation camera to a ground surface; and calculating the pitch angle based on the viewing angle of the navigation camera and the vertical distance.

17. The method according to claim 1, wherein the object is a vehicle, and the navigation interface is displayed through a navigation screen.

18. A computer device comprising:

one or more processors; and one or more memories storing one or more computer-readable instructions that, when executed by the one or more processors, cause the one or more processors to:

display a navigation interface;

display a first-type navigation map on the navigation interface in response to a target road segment of a road being in a preset road condition and an object being located in a road range other than the target road segment, the first-type navigation map comprising an electronic map that is not generated from real scene images; and display a second-type navigation map on the navigation interface in response to the target road segment being in the preset road condition and the object being located within the target road segment, a scale used in the second-type navigation map being greater than a scale used in the first-type navigation map, the second-type navigation map comprising a real scene navigation map in a form of an augmented reality (AR) map generated from images captured in real time by a navigation camera mounted to the object, wherein the second-type navigation map is displayed at a pitch angle for viewing the road from a perspective of the object, the pitch angle matches a viewing angle of the navigation camera, and wherein the displaying the second-type navigation map on the navigation interface includes: determining a drivable area on the road for the object; determining a map scale based on the drivable area and a display size of the navigation interface; and displaying the second-type navigation map on the navigation interface by using the map scale.

19. One or more non-transitory computer-readable storage media storing one or more computer-readable instructions that, when executed by one or more processors, cause the one or more processors to:

display a navigation interface;

display a first-type navigation map on the navigation interface in response to a target road segment of a road being in a preset road condition and an object being located in a road range other than the target road segment, the first-type navigation map comprising an electronic map that is not generated from real scene images; and display a second-type navigation map on the navigation interface in response to the target road segment being in the preset road condition and the object being located within the target road segment, a scale used in the second-type navigation map being greater than a scale used in the first-type navigation map, the second-type navigation map comprising a real scene navigation map in a form of an augmented reality (AR) map generated from images captured in real time by a navigation camera mounted to the object, wherein the second-type navigation map is displayed at a pitch angle for viewing the road from a perspective of the object, the pitch angle matches a viewing angle of the navigation camera, and wherein the displaying the second-type navigation map on the navigation interface includes: determining a drivable area on the road for the object; determining a map scale based on the drivable area and a display size of the navigation interface; and displaying the second-type navigation map on the navigation interface by using the map scale.

* * * * *